(12) United States Patent
Mallya

(10) Patent No.: US 10,196,544 B2
(45) Date of Patent: Feb. 5, 2019

(54) TAPE CLOSURE SYSTEM

(71) Applicant: FLEX R&D, Inc., Beverly Hills, CA (US)

(72) Inventor: Prakash Mallya, Sierra Madre, CA (US)

(73) Assignee: FLEX R&D, INC., Beverly Hills, CA (US)

( * ) Notice: Subject to any disclaimer, the term of this patent is extended or adjusted under 35 U.S.C. 154(b) by 0 days.

(21) Appl. No.: 15/680,900

(22) Filed: Aug. 18, 2017

(65) Prior Publication Data

US 2018/0282584 A1  Oct. 4, 2018

Related U.S. Application Data

(60) Provisional application No. 62/478,312, filed on Mar. 29, 2017.

(51) Int. Cl.
*B32B 33/00* (2006.01)
*C09J 7/02* (2006.01)

(52) U.S. Cl.
CPC ....... *C09J 7/0207* (2013.01); *C09J 2201/128* (2013.01); *C09J 2201/28* (2013.01); *C09J 2201/32* (2013.01); *C09J 2201/36* (2013.01); *C09J 2201/606* (2013.01); *C09J 2205/10* (2013.01)

(58) Field of Classification Search
CPC .......... C09J 7/0207; C09J 2201/128; C09J 2201/28; C09J 2201/36; C09J 2201/606; C09J 2201/32; C09J 2205/10; Y10T 428/14; Y10T 428/28
See application file for complete search history.

(56) References Cited

U.S. PATENT DOCUMENTS

| | | |
|---|---|---|
| 3,314,838 A | 4/1967 | Erwin |
| 3,331,279 A | 7/1967 | Erik et al. |
| 4,376,151 A | 3/1983 | Parrotta |
| 4,556,595 A | 12/1985 | Ochi |
| 4,937,040 A * | 6/1990 | Holcomb ............... B65D 33/20 206/807 |
| 5,141,790 A | 8/1992 | Calhoun et al. |

(Continued)

FOREIGN PATENT DOCUMENTS

| | | |
|---|---|---|
| EP | 1 214 384 A1 | 6/2002 |
| EP | 2 424 948 A2 | 3/2012 |
| WO | WO 2009/137588 | 11/2009 |

OTHER PUBLICATIONS

International Search Report in International application No. PCT/US2018/024527.

(Continued)

*Primary Examiner* — Patricia L. Nordmeyer
(74) *Attorney, Agent, or Firm* — Rajendra Sardesai

(57) ABSTRACT

A tape closure system is shown and described herein. The tape closure system includes a first tape component having a pressure sensitive adhesive and a second tape component having a pressure sensitive adhesive, where at least one of the pressure sensitive adhesives has a modified surface to reduce the tack of the surface such that when the first and second pressure adhesives are brought into contact with one another they may sufficiently adhere to one another to form a seal but are still separable from one another and able to be repeatedly opened and sealed.

27 Claims, 15 Drawing Sheets

(56) References Cited

U.S. PATENT DOCUMENTS

| | | | |
|---|---|---|---|
| 5,346,766 A | 9/1994 | Otter et al. | |
| 5,871,607 A | 2/1999 | Hamilton et al. | |
| 6,076,969 A | 6/2000 | Jaisle et al. | |
| 6,159,596 A * | 12/2000 | Calhoun | A44B 18/0007 |
| | | | 24/304 |
| 6,393,673 B1 * | 5/2002 | Kourtidis | A44B 18/0065 |
| | | | 24/304 |
| 6,541,098 B2 | 4/2003 | Venkatasanthanam | |
| 7,316,052 B2 | 1/2008 | Pawloski et al. | |
| 7,340,807 B2 | 3/2008 | Dais et al. | |
| 7,516,596 B2 | 4/2009 | Henderson et al. | |
| 7,736,058 B2 | 6/2010 | Tanaka et al. | |
| 7,857,515 B2 | 12/2010 | Dais et al. | |
| 8,875,356 B2 * | 11/2014 | Zerfas | A44B 18/0007 |
| | | | 24/114.6 |
| 2011/0171430 A1 | 7/2011 | Mayers et al. | |
| 2014/0069061 A1 | 3/2014 | Anzini | |

OTHER PUBLICATIONS

Written Opinion of the International Searching Authority in International application No. PCT/US 2018/024527.

* cited by examiner

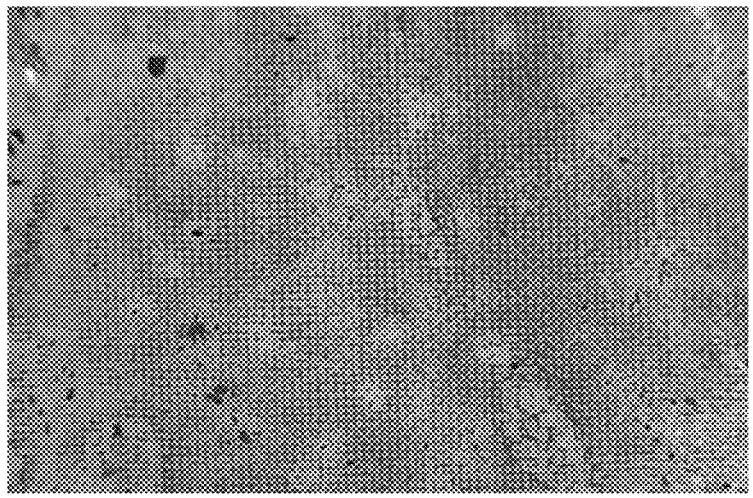
FIGURE 8: Example 1.2.1
FIGURE 9: Example 1.1.9

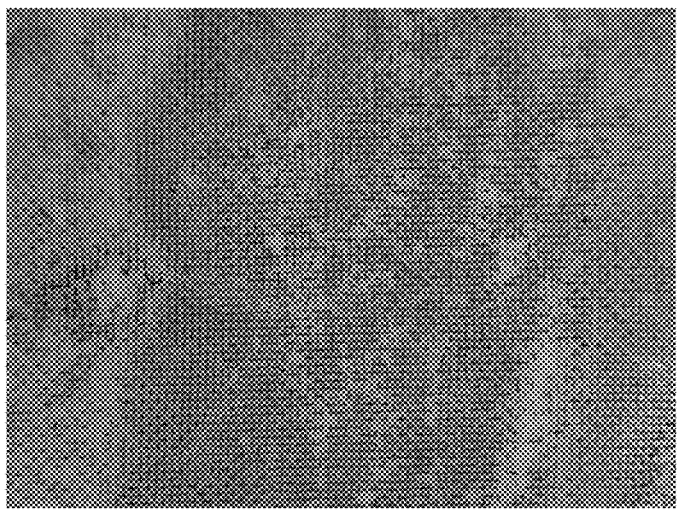
FIGURE 10: Example 1.2.2
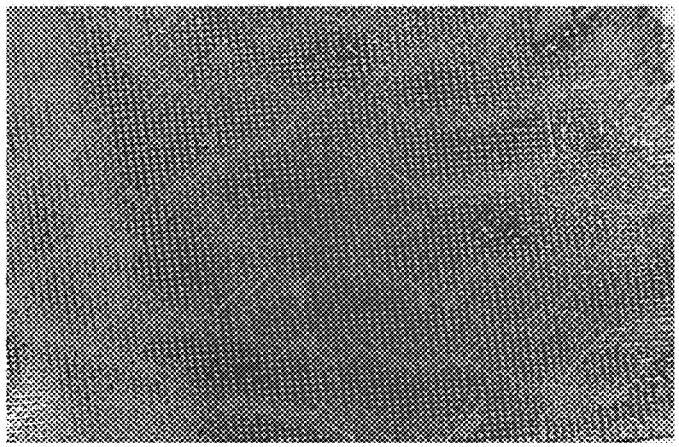
FIGURE 11: Example 1.2.3

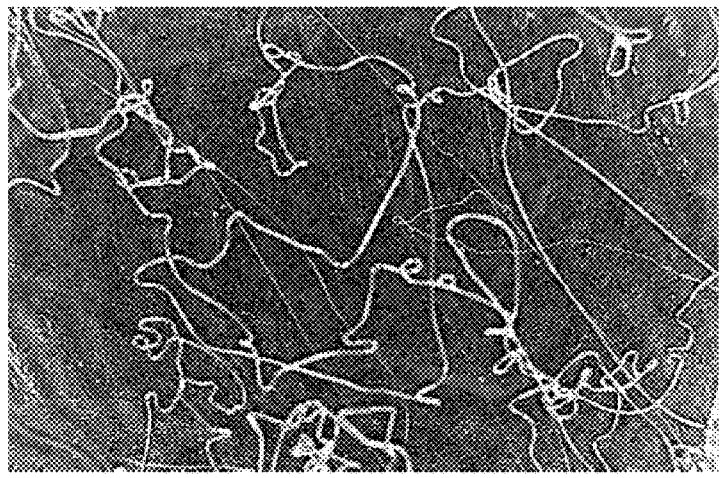
FIGURE 12: Example 2.1
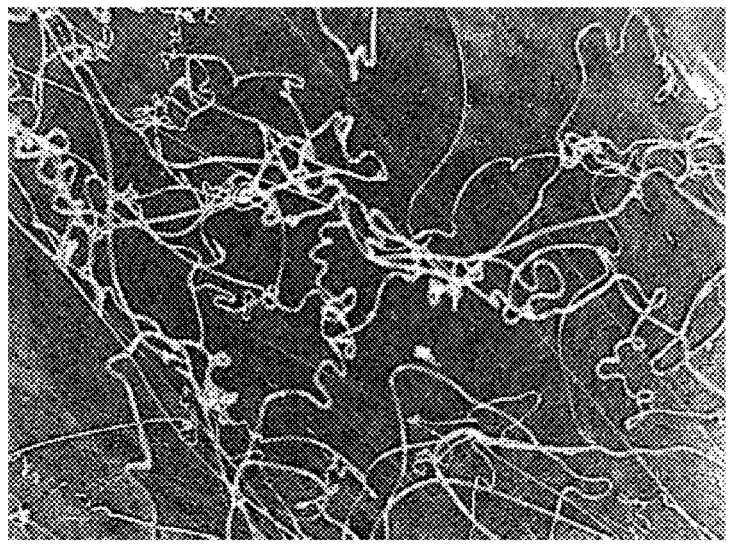
FIGURE 13: Example 2.1.1

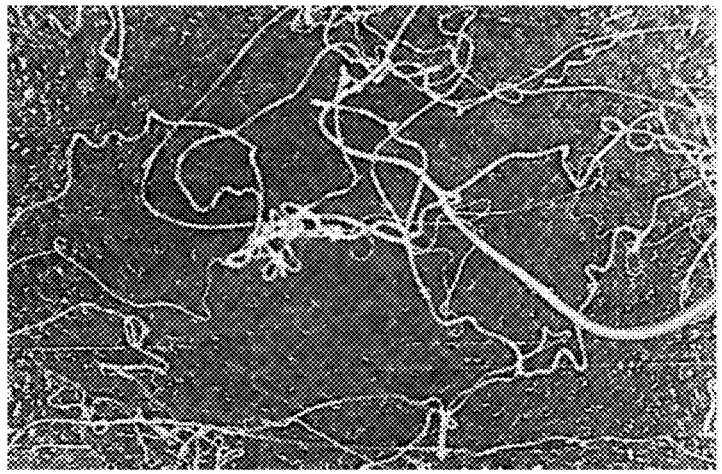
FIGURE 14: Example 2.1.2
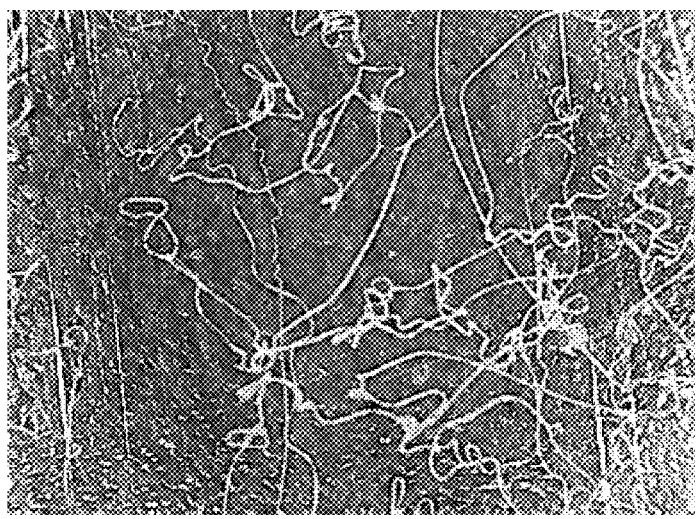
FIGURE 15: Example 2.1.3
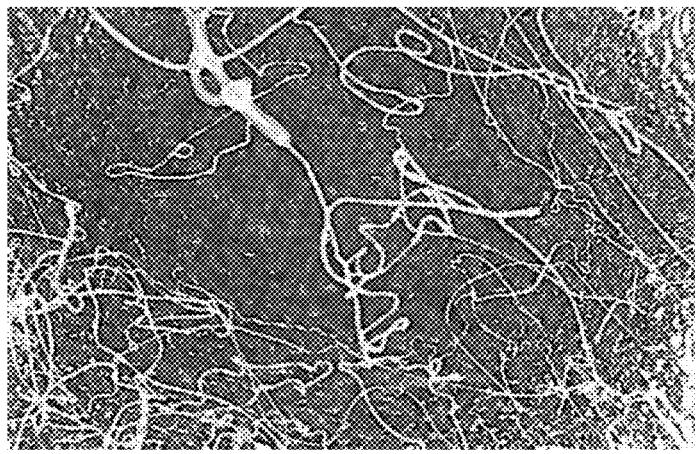
FIGURE 16: Example 2.1.4

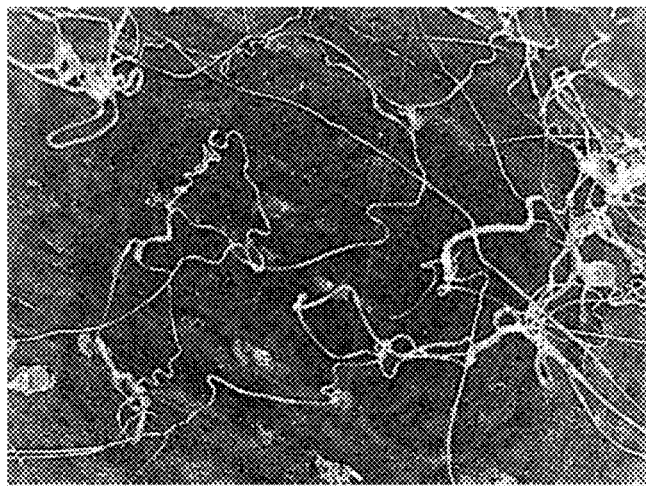
FIGURE 17: Example 2.2.2
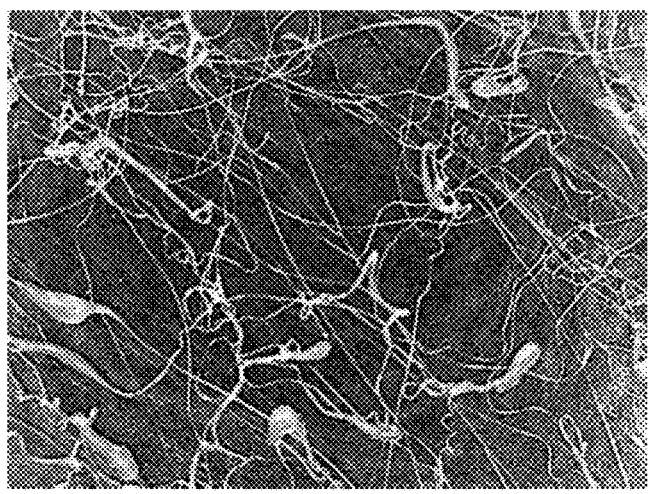
FIGURE 18: Example 2.2.3
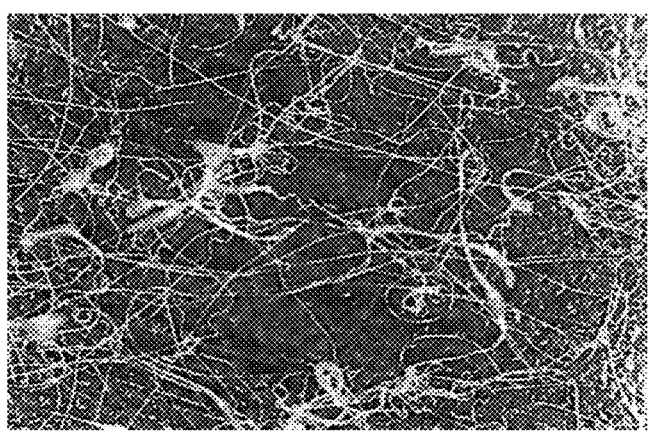
FIGURE 19: Example 2.2.4

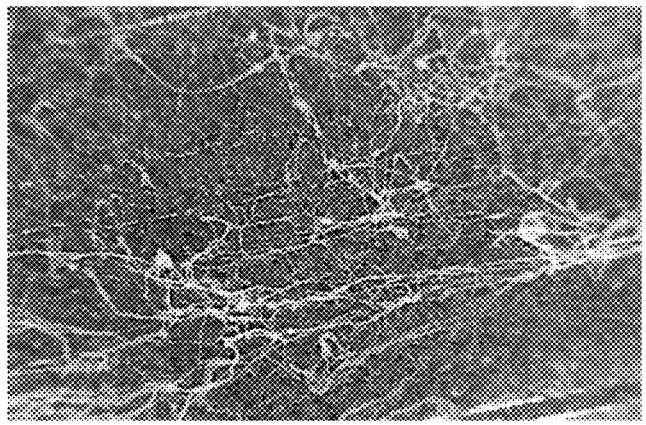
FIGURE 20: Example 2.3.1
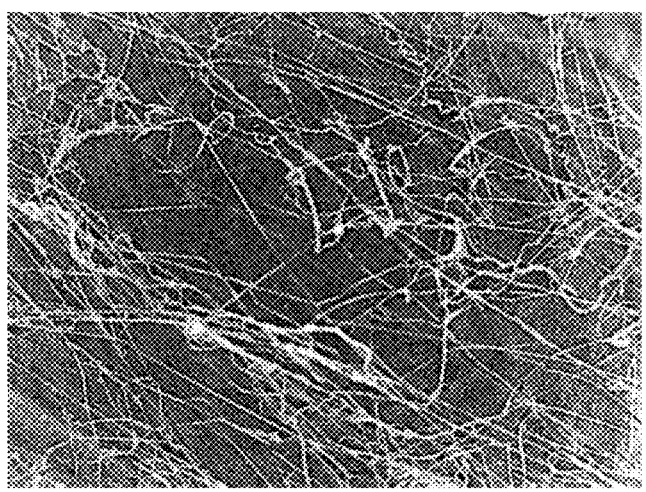
FIGURE 21: Example 2.3.2
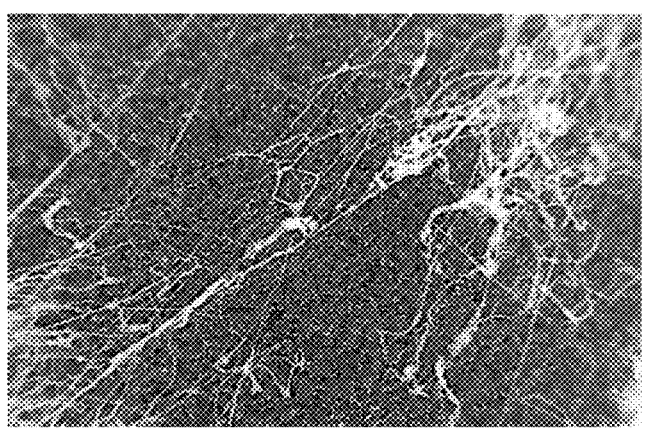
FIGURE 22: Example 2.3

TAPE CLOSURE SYSTEM

CROSS-REFERENCE TO RELATED APPLICATIONS

The present application claims priority to and the benefit of U.S. Provisional Application 62/478,312 filed on Mar. 29, 2017, the entire disclosure of which is incorporated herein by reference in its entirety.

FIELD OF INVENTION

The present invention relates to a two-part adhesive-based closure system which allows both ease of closure without careful alignment of the components and the ability to open and reclose many times. The system includes a pressure sensitive adhesive surface having a modified surface topography to provide a surface having a relatively low tack or non-tacky surface. The pressure sensitive adhesive of at least one adhesive is provided with a surface having a low or non-tacky surface such that when it is brought together with another adhesive surface (e.g., of a second tape) it can adhere to and form a seal with the other adhesive surface, but such that the adhesive surfaces may be easily separated from one another. Such a system provides a resealable closure system for a variety of packages. Further the design limits fouling of the sealing area by contaminants which may contact said area.

BACKGROUND

Closure systems for packaging, e.g., food packaging, may be categorized into three general categories: (i) cohesives, (ii) pressure sensitive adhesive based closures, and (iii) mechanical closures. A cohesive is a class of material that has no tack or adhesion except to itself. An example of a cohesive system is illustrated in U.S. Pat. No. 6,076,969. These materials are often used to attach and form secure closures in food packaging such as, for example, in candy bars. These closures are essentially "one use" closure systems that are not suitable for repeatedly opening and closing the package.

Many packages are provided with a closure system to allow for repeated opening and resealing of the package to protect the contents inside the package. Pressure sensitive adhesive-based closures and mechanical closures may be employed for such applications. Pressure sensitive adhesive systems have been provided as detackified adhesives where the intrinsic properties of the adhesive are manipulated to reduce the tack and peel adhesion (see, e.g., U.S. Pat. No. 5,346,766). For example, the modulus of the adhesive may be adjusted to reduce the initial tack and peel adhesion. In these types of adhesives, adhesion builds over time as the adhesive flows and recovers its intrinsic properties.

Pressure sensitive based closures are based on simple PSA tapes attached to one of the side package adhering to the substrate on the other side. In some of those cases, an adhesive is modified with an additive such as a cluster of particles, powders or talc on the surface to alter the initial tack and peel properties of the adhesive. There are cases of PSA systems wherein the surface is modified with glass particles such as in U.S. Pat. No. 5,141,790. Although such tapes or laminates are not used in food closure and packaging applications, in these systems, pressure is used to press in on the additive, e.g., the glass particles, to embed them into the adhesive bulk and the adhesion builds rapidly. A number of patents such as U.S. Pat. No. 4,376,151, U.S. Pat. No. 4,556,595, U.S. Pat. No. 3,331,279, and U.S. Pat. No. 3,314,838 all fall within this category to limit the initial adhesion and then activate the adhesion to a substrate by pressing down with pressure. These kinds of PSA laminates are used for industrial graphics applications such as the decoration of sides of trucks, etc. where the slidability of these large graphics on substrates is needed. A number of other patents, such as U.S. Pat. No. 6,541,098 and U.S. Pat. No. 5,871,607, deal with modification of the surface of a highly conformable film or substrate with a topology of upraised non-tacky regions and valleys with adhesive. These structures provide the non-tacky feel to the finger as it slides along the upraised non-tacky regions. On applying pressure, the finger then contacts the adhesives in the valleys building adhesion. These have been used for applications such as Glad Press n Seal.

In the afore mentioned adhesives, the adhesives are applied to one surface of the package and are suitable for adhering to another surface of the package that is free of any adhesive.

Mechanical systems include such items as Velcro, "zipper" systems, hook and loop, slider systems, "mushroom" type closures, and various male/female closure systems, etc., and are commonly used on packages to allow for opening and resealing or closing the package. Examples of such systems are illustrated in U.S. Pat. No. 7,857,515 (hook and loop), U.S. Pat. No. 7,736,058 (mushroom type), U.S. Pat. Nos. 7,316,052, 7,340,807, and U.S. Patent Publication No. 2011/0171430 (male/female closure systems). Such systems require careful alignment of the components to close the package correctly. Additionally, such systems are three-dimensional in character and add to the surface profile of the package. Mechanical systems are also typically expensive and difficult to manufacture and apply for certain types of packages.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In accordance with one aspect, provided is an adhesive closure system having a reduced tack to allow for sealing and unsealing a package numerous times. The adhesive closure system includes a first adhesive surface and a second adhesive surface configured to engage the first adhesive surface. At least one of the adhesive surfaces is provided such that it has a reduced tack. In some embodiments, both the first adhesive surface and the second adhesive surface are modified to have a reduced tack. The first and second adhesives are configured to mate with one another, where the reduced tack adhesive surface(s) allow for adequate sealing but still permit relatively easy separation of the surfaces.

In one aspect, provided is a tape-based closure system comprising a first tape having a first pressure sensitive adhesive surface and a second tape having a second pressure sensitive adhesive surface, wherein at least one of the first or second pressure sensitive adhesive surfaces is modified with an additive such that the pressure sensitive adhesive surface has a reduced tack.

This closure system is a low-cost alternate to zippers, sliders, Velcro, and other such closure systems for items that require repeated and easy closing and opening without careful alignment. Such an adhesive tape system is achieved through modifying the topology of one or both of the pressure-sensitive adhesive surfaces through a non-tacky additive such as ink, filler, or other polymeric or non-polymeric material which protrudes from one or both surfaces of the adhesive. The additive modifies the surface to make it low or non-tacky to touch and slideable to the finger. The modifiers can also prevent contamination of the adhesive such as by preventing adhesion of foreign substances, such as food stuffs or contents of a package, to the adhesive surface. Such contamination could limit or minimize the adhesion of the adhesive surfaces to one another, which might reduce the number of times the closure system can be opened and resealed. The additive may be randomly or uniformly distributed on one or both surfaces of the adhesive. When the two surfaces are brought together and pressed, the tacky parts in the valleys of one surface contact the hills or the smooth part on the adjacent surface forming a bond. The bond strength may be controlled by various factors including, for example, adhesive coat weight, amount of additive on the surfaces, the surface coverage of the additive, the height, size and modulus of the additive, contact area between the two surfaces, force applied to close, and the time of contact. The bond strength may be tailored to be low enough to open easily but high enough to form a good and generally continuous seal.

In one aspect, provided is an adhesive closure system comprising: a first pressure sensitive adhesive having an upper adhesive surface; and a second pressure sensitive adhesive having an upper adhesive surface, wherein the adhesive surfaces of the first and second pressure sensitive adhesives can be repeatedly attached and detached to one another to form a closure, and the adhesive surface of (i) the first pressure sensitive adhesive, (ii) the second pressure sensitive adhesive, or (iii) both the first pressure sensitive adhesive and the second pressure sensitive adhesive comprise a plurality of standoffs defining a modified surface topography.

In one or more embodiments, the adhesive closure system may include any of the following features separately or in combination with one another:

Each of the first pressure sensitive adhesive and the second pressure sensitive adhesive has a modified surface topography.

The standoffs (or projections or protrusions) are provided by a filler admixed with the pressure sensitive adhesive.

The standoffs are provided by a material applied to the surface of the pressure sensitive adhesive.

The standoffs are formed from an ink, an elastomeric material, or a polymeric material or an inorganic material.

The standoffs are formed from a hot melt elastomer, an emulsion elastomer, or a combination thereof.

The standoffs are provided as discrete, regular shapes.

The standoffs are provided in a regular pattern.

The standoffs are provided in a random arrangement.

The standoffs are provided as elongated lines, fibrils, or filaments.

The standoffs in the shape of elongated lines, fibrils, or filaments are disposed in a random array.

The standoffs cover from about 5% to about 60% of the surface area of the adhesive surface; from about 10% to about 50%; from about 15% to about 45%; or from about 20% to about 30% of the total surface area of the pressure sensitive adhesive surface.

The system has a T Peel value of from about 0.2 N/inch to about 20 N/inch; from about 0.5 N/inch to about 10 N/inch; from about 1 about 5 N/inch; or from about 2 to about 4 N/inch.

The system has a T Peel value of at least 0.5 N/inch or higher after 10 reclosures.

The system has a T Peel value of 0.5 N/inch to 15 N/inch; from 1 N/inch to 10 N/inch, or from 2 N/inch to 4 N/inch after 10 reclosures.

The height of the standoff is from about 2 μm to about 500 μm; from about 10 μm to about 300 μm; from about 25 μm to about 250 μm; from about 50 μm to about 150 μm; even from about 30 μm to about 100 μm.

The standoffs may have a diameter or thickness of from about 5 μm to about 500 μm; from about 10 μm to about 250 μm; from about 25 μm to about 150 μm; even from about 30 μm to about 100 μm.

The coat weight of the standoffs is in the range of from about 2 grams/m$^2$ (gsm) to about 40 gsm; from about 5 gsm to about 30 gsm; even from about 2 to about 25 gsm.

The first pressure sensitive adhesive and the second pressure sensitive adhesive are provided as a tape.

In one aspect, provided is a package having a first surface and a second surface adapted to be releasably joined together, the article comprising an adhesive closure system according to any of the previous embodiments.

In one aspect, provided is a tape comprising a facestock or carrier film, a first adhesive disposed on a lower surface of the facestock or carrier film, and a second adhesive disposed on the upper surface of the facestock or carrier film, the second adhesive being a pressure sensitive adhesive having a plurality of standoffs defining a modified surface topography. In one embodiment, the tape is disposed on a liner such that the first adhesive is adjacent to the liner. The liner is a film or paper which is coated on one or both sides with a silicone or other release material from which the adhesives can be easily removed. The tape may be provided as a roll in wound form by winding the tape onto itself so the second adhesive contacts a surface of the liner during storage. The tape may be provided such that:

The standoffs are provided by a filler admixed with the pressure sensitive adhesive.

The standoffs are provided by a material applied to the surface of the pressure sensitive adhesive.

The standoffs are formed from an ink, an elastomeric material, a polymeric material or an inorganic material.

The standoffs are formed from a hot melt elastomer, an emulsion elastomer, an inorganic material or a combination thereof.

The standoffs are provided as discrete, regular shapes.

The standoffs are provided in a regular pattern.

The standoffs are provided in a random arrangement.

The standoffs are provided as elongated lines or continuous or discontinuous filaments.

The standoffs in the shape of elongated lines are disposed in a random array.

The standoffs cover from about 5% to about 60% of the surface area of the adhesive surface; from about 10% to about 50%; from about 15% to about 45%; even from about 20% to about 40% of the total surface area of the pressure sensitive adhesive surface.

The system has a T Peel value of from about 0.2 N/inch to about 20 N/inch; from about 0.5 N/inch to about 10 N/inch; from about 1 N/inch to about 5 N/inch; even from about 2 N/inch to about 4 N/inch.

The system has a T Peel value of at least 0.5 N/inch or higher after 10 reclosures.

The system has a T Peel value of 0.5 N/inch to 15 N/inch; from 1 N/inch to 10 N/inch, or from 2 N/inch to 4 N/inch after 10 reclosures.

The height of the standoff is from about 2 µm to about 500 µm; from about 10 µm to about 300 µm; from about 25 µm to about 250 µm; from about 50 µm to about 150 µm; even from about 75 µm to about 100 µm.

The standoffs may have a diameter or thickness of from about 5 µm to about 500 µm; from about 10 µm to about 250 µm; from about 25 µm to about 150 µm; even from about 50 µm to about 100 µm.

The coat weight of the standoffs is in the range of from about 2 gsm to about 40 gsm; from about 5 gsm to about 30 gsm; even from about 10 to about 25 gsm; or about 2 to about 25 gsm

BRIEF DESCRIPTION OF THE DRAWINGS

The accompanying drawings illustrate various systems, apparatuses, devices and related methods, in which like reference characters refer to like parts throughout, and in which:

FIG. 2b is a cross-sectional view of the tape closure system of FIG. 2a;

FIG. 8 is a micrograph of a surface of a modified pressure sensitive adhesive of Example 1;

FIG. 9 is a micrograph of a surface of a modified pressure sensitive adhesive of Example 1;

FIG. 10 is a micrograph of a surface of a modified pressure sensitive adhesive of Example 1;

FIG. 11 is a micrograph of a surface of a modified pressure sensitive adhesive of Example 1;

FIG. 12 is a micrograph of a surface of a modified pressure sensitive adhesive of Example 2;

FIG. 13 is a micrograph of a surface of a modified pressure sensitive adhesive of Example 2;

FIG. 14 is a micrograph of a surface of a modified pressure sensitive adhesive of Example 2;

FIG. 15 is a micrograph of a surface of a modified pressure sensitive adhesive of Example 2;

FIG. 16 is a micrograph of a surface of a modified pressure sensitive adhesive of Example 2;

FIG. 17 is a micrograph of a surface of a modified pressure sensitive adhesive of Example 2;

FIG. 18 is a micrograph of a surface of a modified pressure sensitive adhesive of Example 2;

FIG. 19 is a micrograph of a surface of a modified pressure sensitive adhesive of Example 2;

FIG. 20 is a micrograph of a surface of a modified pressure sensitive adhesive of Example 2;

FIG. 21 is a micrograph of a surface of a modified pressure sensitive adhesive of Example 2; and FIG. 22 is a micrograph of a surface of a modified pressure sensitive adhesive of Example 2.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is an adhesive closure system. In embodiments, the closure system is a two-part tape based closure system comprising a first tape having a first pressure sensitive adhesive surface and a second tape having a second pressure sensitive adhesive surface, wherein the first pressure sensitive adhesive and/or the second pressure sensitive adhesive is modified to provide a surface having a reduced tack. The modified pressure sensitive adhesive surface is modified such that the surface has a relatively low tack or is non-tacky. The modified pressure sensitive adhesive surface has a tack such that an object, e.g., a finger, contents of a container, etc., can move over the modified pressure sensitive adhesive without sticking. The closure system with the modified pressure adhesive surface(s) allows for the pressure sensitive adhesive surfaces to be brought together and adhered to one another (to form a seal or closure), but the modified surface(s) allows for the surfaces to be separated from or pulled apart from one another. The sealing and unsealing may be repeated numerous times to operate as a resealable closure system.

Figure 1:
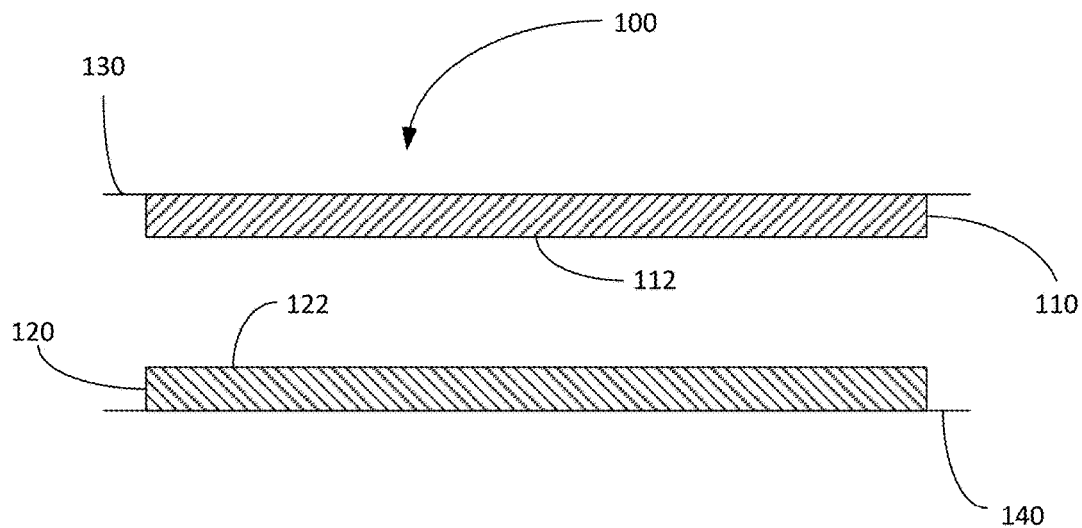
FIG. 1 is a cross-sectional view of a tape closure system in accordance with an embodiment.

Referring to FIG. 1, an embodiment of a tape closure system 100 is shown. The system includes a first pressure sensitive adhesive 110 having a first pressure sensitive adhesive surface 112, and a second pressure sensitive adhesive 120 having a second pressure sensitive adhesive 122. Each of the pressure sensitive adhesives is attached to a surface (130 and 140, respectively). The surface 112 and/or the surface 122 is modified with an additive or material to reduce the tack of the surface. The pressure sensitive adhesive surface 112 may be brought into contact with pressure sensitive adhesive surface 122, and, with the application of limited pressure, the surfaces will stick together to form a closure or seal. The closure can be opened or unsealed by applying a pressure or force to pull the surfaces away from one another.

The respective components of the closure system comprise a pressure sensitive adhesive. The pressure sensitive adhesive may be provided as a transfer tape, a double-sided tape, or coated on a facestock such as, for example, a paper, a film, or a foil. Referring to FIG. 2, an embodiment is shown in which one of the tape components of the enclosure system is provided as a double-sided tape 200. The tape 200 includes an adhesive which could be a heat, ultrasonic, RF activatable, or water, or solvent activatable adhesive, or a pressure sensitive adhesive 210, a facestock or carrier film 220, and a pressure sensitive adhesive 230. The upper surface of the pressure sensitive adhesive 230 is modified to provide a surface 232 having a reduced tack. The tape is disposed on a liner 240 when a pressure sensitive adhesive is used. The liner 240 can be a single or a double-sided liner having a release surface (e.g., a silicone release surface) on one or both sides. The liner can be a filmic or a paper liner. In cases, where a PSA is used, the tape is removed from the liner to expose the adhesive 210, which will be used to adhere the tape to a surface (e.g., a surface of a container or package). The pressure sensitive adhesive 230 remains exposed and will provide the contact points with an opposing surface or tape to close or seal the package. The pressure sensitive adhesive 230 is modified with an additive or material to provide a reduced tack surface. The tape 200 may be provided as a roll in wound form by winding the tape onto itself so the pressure sensitive adhesive 230 contacts the surface 242 of the liner 240 during storage. The tape may be supplied in bulk to a dispensing unit for applying to a substrate in a package forming process. The tape could be provided, if desired, in an individual dispenser (e.g., similar to a Scotch™ tape dispenser) to manually remove a tape segment or strip as desired.

As described above, one or both parts of the closure system may be modified to provide the reduced tack surface. Referring back to FIG. 1, in one embodiment, the first pressure sensitive adhesive 110 is provided with a modified surface 112. In one embodiment, the second pressure sensitive adhesive 120 is provided with a modified surface 122. In still another embodiment, both of the pressure sensitive adhesives 110 and 120 are provided with modified surfaces. Further, it will be appreciated that the respective tape components (e.g., tape 110 or 120) may be the same or different. For example, the tape components may use the same or different adhesive material. If both pressure sensitive adhesive surfaces are modified, the material providing the modified surface may be the same or different from one another.

One or both of the pressure sensitive adhesives is modified to produce a pressure sensitive adhesive surface having a relatively low, or non-tacky surface. The modified surface having a low or non-tacky surface may also be referred to herein as a "detack surface." The pressure sensitive adhesive is modified by an additive that is either (i) admixed with the pressure sensitive adhesive and coated to form the tape, or (ii) applied to a coated pressure sensitive adhesive surface. The additive employed to modify the surface may be referred to herein as a "detack layer" or "detackified surface." Applying the additive to a coated pressure sensitive adhesive surface may be accomplished by any suitable method including, but not limited to, spraying, sprinkling, printing, brushing, dusting, etc.

The pressure sensitive adhesive employed as part of the tape system is not particularly limited and may be chosen as desired for a particular purpose or intended application. The PSA can be solvent, emulsion, or warm/hot melt based and can be removable or permanent. The PSA can be cured subsequent to coating using any of a number of crosslinking mechanisms such as ionic, hydrogen bonding, chemical, or mixtures thereof and using stimuli such as thermal, UV, IR, or EB radiation. Any of a number of PSAs from suppliers such as Dow, Henkel, BASF, and Avery Dennison can be used for making these two-part tape-based closure system. Some examples of hot melt PSAs that can be used are HL 8005X, Swiftmelt 82674PW, HL 2811-PW from HBFuller and FA 20, Hammerlock, R128 and Z3000 from Avery Dennison. Some examples of emulsion PSAs are AT20, AT20A, E898 from Avery Dennison. The choice of PSA is dictated by requirements such as adhesion under refrigerator or freezer conditions, adhesion under wet conditions, adhesion to wet surfaces, adhesion under oily and fatty conditions, adhesion to oily and fatty surfaces, adhesion after powdery and other particulate contaminants have been poured across the tape surface, FDA requirements for direct or indirect food contact, etc. The PSA may be provided in a coat weight of from about 10 gsm to about 100 gsm; from about 20 gsm to about 80 gsm; even from about 40 to about 60 gsm. In one embodiment, the coat weight is from about 20 to about 40 gsm.

Figure 3A:
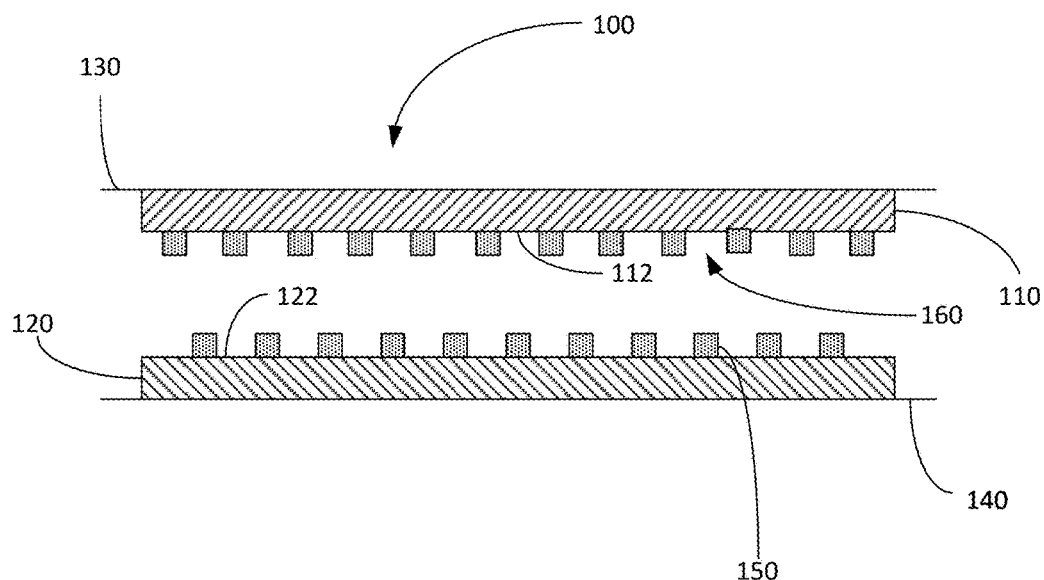
FIG. 3a is a cross-sectional view of a tape closure system in accordance with an embodiment showing details related to the modified surface.
Figure 3B:
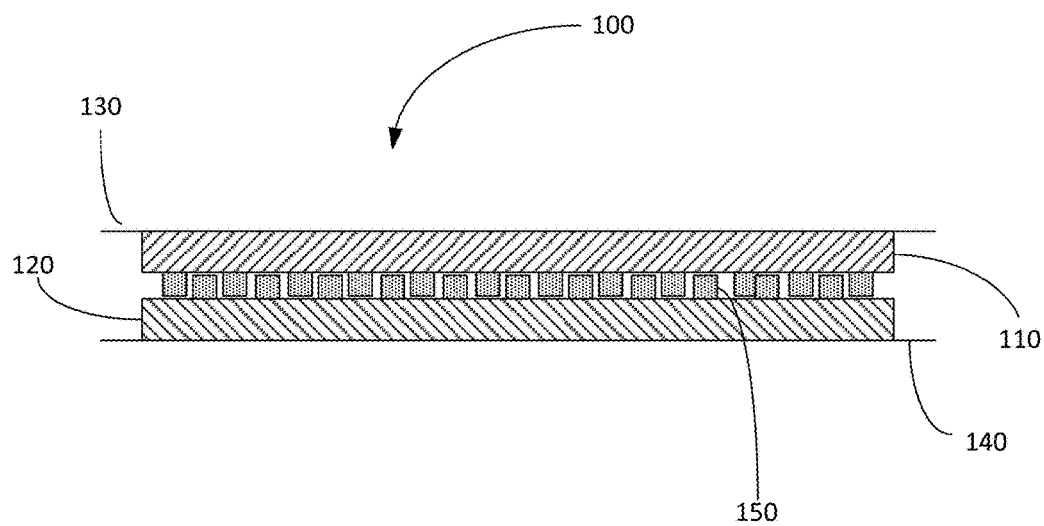
FIG. 3b is a cross-sectional view of the tape closure system of FIG. 3a in a closed configuration.

The pressure sensitive adhesive is modified to provide a modified surface topography that will reduce the tack of the pressure sensitive adhesive. FIG. 3a illustrates a more detailed view of the modified adhesive surface(s). The additive or other material provides a plurality of standoffs (or projections or protrusions) 150 and recessed areas 160. The standoffs provide a partially raised surface area relative to the surface of the adhesive. FIG. 3b illustrates the tape system in a closed configuration when the modified tape surfaces are brought into contact with one another. Without being bound to any particular theory, when a modified surface is brought into contact with the surface of the other tape component, the tacky parts in the recessed areas 160 contact the smooth surface of the other tape component or contact the protrusions 150 if the other tape surface is also provided with a modified surface topography. It will be appreciated that there may be areas of adhesives surfaces 130 and 140 that come together and contact one another when the tape components are brought together to provide the closed or sealed configuration.

The type, modulus, particle size, shape, height, amount, and coverage of the PSA surface with the additive controls the level of tack of the PSA surface and slidability of the finger along the surface. The amount of additive controls the contact made between the PSA of the two surfaces and the peel value when the two surfaces are brought together and bonded using applied pressure. Too little additive provides low surface coverage of the additive, and high contact area between the adjoining PSA surfaces leading to a strong bond, while too much additive leads to a weak bond.

It will be appreciated that FIGS. 3a and 3b are merely illustrative of an embodiment of a modified surface. It will be appreciated that the standoffs may be provided in any arrangement and need not be ordered as shown in FIGS. 3a and 3b. The standoffs defining the detack surface could be provided as a regular repeating array or as a random array. Additionally, the standoffs need not be provided as discrete shapes as shown in FIGS. 3a and 3b but could be provided by non-regular shapes, lines, filaments, fibrils, etc. The standoffs do not necessarily have to be ordered such that standoffs on opposing adhesive surfaces do not contact one another. That is, a standoff on one adhesive surface may contact all, or a portion of, or none of, a standoff on the opposing adhesive surface. Further, adhesive on one side of the reclosure could contact adhesive on the other side or a combination of adhesive and standoff on the other side.

In one embodiment, the filler material is admixed with the pressure sensitive adhesive prior to coating. The additive is provided such that, upon formation of the pressure sensitive adhesive surface (e.g., via drying or curing or merely coating), the particles protrude or project from the surface of the adhesive. In another embodiment, the standoffs may be provided by applying an additive or material to a pressure sensitive adhesive. In such embodiments, the additive may be applied to the pressure sensitive adhesive surface by any suitable method including, but not limited to, printing, spraying, sprinkling, dusting, brushing, etc.

The standoffs may be provided in a random array or in a regular or uniform pattern. Methods such as printing may be required to provide the standoffs in a regular/uniform pattern. This allows a user to control the surface topography of the pressure sensitive adhesive. The standoffs may be provided as discrete dots or shapes or may be provided as a series of lines or filaments or fibrils of a uniform or varied (i.e. non-uniform) length or thickness. When provided as lines (including as filaments or fibrils) or shapes of a substantial length, the lines may be provided as uniform or random lines and may be straight, curved, undulating, zig-zag, stepped, etc.

Examples of suitable fillers include, but are not limited to, inorganic fillers, polymeric beads, etc. Some specific examples of suitable materials for providing the standoffs include, but are not limited to, hollow Expancel polymeric beads from Akzo Nobel, solid, elastic polymeric beads from any of a number of suppliers, or inorganic fillers such as $CaCO_3$ from JM Huber Corporation. Inorganic fillers and polymer particles may be provided by admixing the inorganic filler or polymer particles into the pressure sensitive adhesive prior to coating. Alternatively, the inorganic filler or polymer particles may be applied to the surface of a pre-coated pressure sensitive adhesive by spraying, dusting, sprinkling, etc.

In other embodiments, the standoffs may be provided by inks, elastomeric materials, polymeric materials, etc. In embodiments, the standoffs may be provided by hot melt or emulsion polymers. In one embodiment, the standoffs are provided by an emulsion polymer. Such materials may be applied to the surface of a pressure sensitive adhesive by any suitable method including, but not limited to, printing and spraying. The modulus of the polymeric or elastomeric material should be in the range from just below Dahlquist criterion ($10^6$ dyne/cm$^2$) and higher. In embodiments, the elastomeric or polymeric material has a modulus of about $0.5 \times 10^6$ dyne/cm$^2$ or greater. Various hot melts can be used for spraying onto the PSA surface, such as Advantra PHC 9200 (softening point (SP) of 102° C.) from HB Fuller, 3H049B (SP of 82° C.), HL 7216 (SP of 74° C.), PHL 4157 (SP of 67° C.), HL-0842S (SP of 155C), Swifttherm 84659 (SP of 117° C.) etc.

In one embodiment, spraying with a hot melt polymer can be carried out using any suitable spray system. An example of a suitable spray system includes, but is not limited to, a Nordson Universal spray nozzle system. Any of a number of different nozzle types to control the filament size and pattern may be used to accomplish spraying. Some nozzle types include the Continuous signature nozzles, Intermittent signature nozzles, and Control coat nozzles made by Nordson.

Liquid based inks can also be used for modifying the PSA surface to provide the standoffs. The inks can be either printed or sprayed. In the lab, a multi-purpose Professional air brush kit such as from Apontus can be used for modifying the PSA surface to provide low to no tack, with good self-stick characteristics.

The adhesion (peel value) of the resulting modified PSA can be varied using a number of variables including, for example, the type of PSA and the coat weight, the height of the standoffs, the diameter or width of the standoffs, the modulus of the standoff, the coat weight of the additive, and the surface coverage. The peel value is also dependent on the flexural modulus and stiffness of the laminate controlled by a number of factors: modulus and stiffness of the facestock material such as PET, BOPP and such, the type of PSA (stiffness and coat weight, i.e. thickness) used to laminate the tape to the bag and the stiffness of the bag material. All these can be manipulated to control the level of detackiness and the adhesion.

The height of the standoffs may be selected as desired for a particular application or intended purpose. Smaller standoffs (i.e. lower height standoffs) will provide a higher level of adhesion between the tapes, which will provide a tighter seal and require a greater force to open the closure. The height of the standoffs may range from a few microns to several hundred microns. In one embodiment, the height of the standoff is from about 2 μm to about 500 μm; from about 10 μm to about 300 μm; from about 25 μm to about 250 μm; from about 50 μm to about 150 μm; even from about 75 μm to about 100 μm. Intermediate heights can be achieved using non-tacky or slightly tacky microspheres or fillers such as $CaCO_3$ having diameters in the range of interest such as 10 to 100 μm. Larger heights can be achieved using the Nordson spray unit.

In embodiments, the standoffs may have a diameter, circumference, or thickness of from about 5 μm to about 500 μm; from about 10 μm to about 250 μm; from about 25 μm to about 150 μm; even from about 50 μm to about 100 μm.

The dimensions of the standoffs and the space between the standoffs and/or surface coverage of the standoffs may be varied to control the bond strength of the reclosure system. For example, the larger the height of the standoff, the greater the distance may be between the standoffs to still achieve a relatively high adhesion. The adhesion is controlled, however, to allow for sufficient adhesion when the modified tape surfaces are brought together, but separated from one another on application of a suitable force.

The coat weight of the printed or sprayed standoffs may be in the range of from about 2 gsm to about 40 gsm; from about 5 gsm to about 30 gsm; even from about 2 to about 25 gsm.

The standoffs, whether premixed with the pressure sensitive adhesive or later applied to a pressure sensitive adhesive surface, may be provided at a concentration to provide a particular surface coverage. The standoff surface coverage will also contribute to the level of adhesion between the tape surfaces. In embodiments, the standoffs cover from about 5% to about 60% of the total surface area of the pressure sensitive adhesive; from about 10% to about 50%; from about 15% to about 45%; even from about 20% to about 30% of the total surface area of the pressure sensitive adhesive.

The peel value is also dependent on the flexural modulus and stiffness of the laminate controlled by a number of factors including, for example, the modulus and stiffness of the facestock material such as PET, BOPP, etc., and the type of PSA (stiffness and coat weight, i.e. thickness) used to laminate the tape and the container material.

The T peel value of the tape to tape laminate (attached to the bag material) can be tailored depending on the application, ease of opening and the number of reclosures needed, and can range from as low about 0.2 N/inch to about 20 N/inch; from about 0.5 N/inch to about 10 N/inch; from about 1 N/inch about 5 N/inch; even from about 2 N/inch to about 4 N/inch. In embodiments, the system has a T Peel value of at least 0.5 N/inch or higher after 10 reclosures. In embodiments, the system has a T Peel value of 0.5 N/inch to 15 N/inch; from 1 N/inch to 10 N/inch, or from 2 N/inch to 4 N/inch after 10 reclosures. Methods of evaluating T Peel are described herein.

The tape product can be further enhanced by using colored inks or other colored additives in the spray, ink, or additive such that one part of the tape has color A, and the other part of the tape has color B so that when the tapes are adhered to one another and arranged in a closed or sealed configuration it leads to a secondary color C indicating that complete closure has taken place. Other functionalities can be contemplated in the tape (either formulated in the adhesive or in the surface modifier) such as tamper evidence, proof of sterilization, anti-bacterial feature to prevent ingress of pathogens, oxygen absorption feature to prevent ingress of oxygen, a PSA that is water resistant to create a waterproof seal, and such.

The tape may be sized and dimensioned as desired for a particular purpose or application. In one aspect, the tape may be sized with a desired width and length to allow for attachment of the tape to a substrate at a desired or selected processing speed. In embodiments, the tape may have a width of from about 0.25 inches to about 3 inches; from about 0.5 inches to about 2 inches; or from about 1 inch to about 1.5 inches. The tape length may vary as desired. In embodiments, the tape has a length of from 0.5 inches to about 60 inches; from about 1 inch to about 45 inches; from about 2.5 to about 30 inches; from about 5 to about 25 inches; from about 10 to about 20 inches.

The tape closure system can be used for a wide range of closure applications and articles utilizing such enclosures. In embodiments, the tape is particularly suitable for use with a flexible package, or a flexible substrate that is attached to a rigid package structure (including, by way of exemplary embodiments, a film or foil lid attached to a plastic cup or holder). The tape closure system may be applied to a variety of materials that are employed to make such containers or packages. Flexible packages may be made from a variety of materials including, by way of exemplary embodiments, polymeric materials, paper, nonwoven materials, foils, and other such materials. Polymeric films are often used to make flexible packages. Suitable polymeric films include, by way of exemplary embodiments, polyolefins, polyesters, nylon materials, etc. Films are typically biaxially oriented polypropylene films, but may be polyester, nylon, cellophane and/or polylactic acid films. Polymeric films produced with a cast or blown process can be used, but their lower machine direction tensile strength and excessive extensibility under tension or under thermal exposure may prevent adequate lamination. These biaxially-oriented polymeric films are typically used as the outer film and the inner film in a composite laminated structure. The above-identified embodiments are exemplary and for the sake of brevity not all applicable package structures are included. The present teachings, however, can apply to any type or configuration of package structures.

Examples of suitable flexible packages include, but are not limited to:

Pillow pouch packages. These packages are sealed on the top and bottom of the package with a vertical seam. Such packages are used with cereal, potato chips, pretzels, etc. The packages may be formed from any suitable material, including, without limitation any type of food safe material.

Stand up pouches, which are typically employed with candy, snacks, liquids, etc. The pouches may be formed from any suitable material, including, without limitation any type of food safe material. Moreover, the pouches may be of any configuration and are not limited to those shown.

Flat bottom bags used for coffee, pet food, or to store large volumes of material. The flat bottom bags may be formed from any suitable material, including, without limitation any type of food safe material.

Double seam consumer bags (e.g., bread bags). The double seam consumer bag may be formed from any suitable material, including, without limitation any type of food safe material.

Bar wrap packages (e.g., for candy bars, snack bars, protein bars, etc.). The bar wrap packages may be formed from any suitable material, including, without limitation any type of food safe material.

Flexible overwrap packages (e.g., for cookies). The flexible overwrap packages may be formed from any suitable material, including, without limitation any type of food safe material.

Flexible lid on a rigid package. The flexible lid may be formed from any suitable material, including, without limitation any type of food safe material.

Persons skilled in the packaging art will understand and appreciate the types of packages described above and will understand that the present teachings apply to any applicable configuration of packaging.

The tape closure system can be employed in articles and packages used for a variety of applications and to store a wide range of materials. The tape may be used in articles as for packaged goods such as pet food bags; prepackaged foods such as cereal; snacks such as chips, cookies, crackers; pre-packaged cheese and meats; confectionary; coffee; nutritional foods; food storage bags; other applications such as in personal care (tissues, diaper tapes and such), or medical, industrial, and other business to business applications. These tapes can also be used for pre-made bags which are used to store all kinds of food and non food items.

Figure 2A:
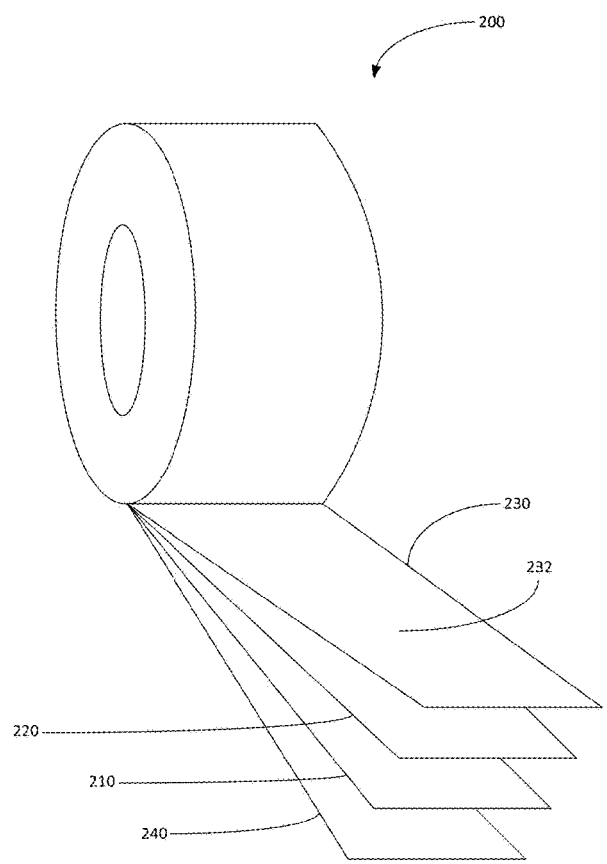
FIG. 2a is a perspective, partial exploded view of a tape in accordance with an embodiment of the technology.
Figure 2B:
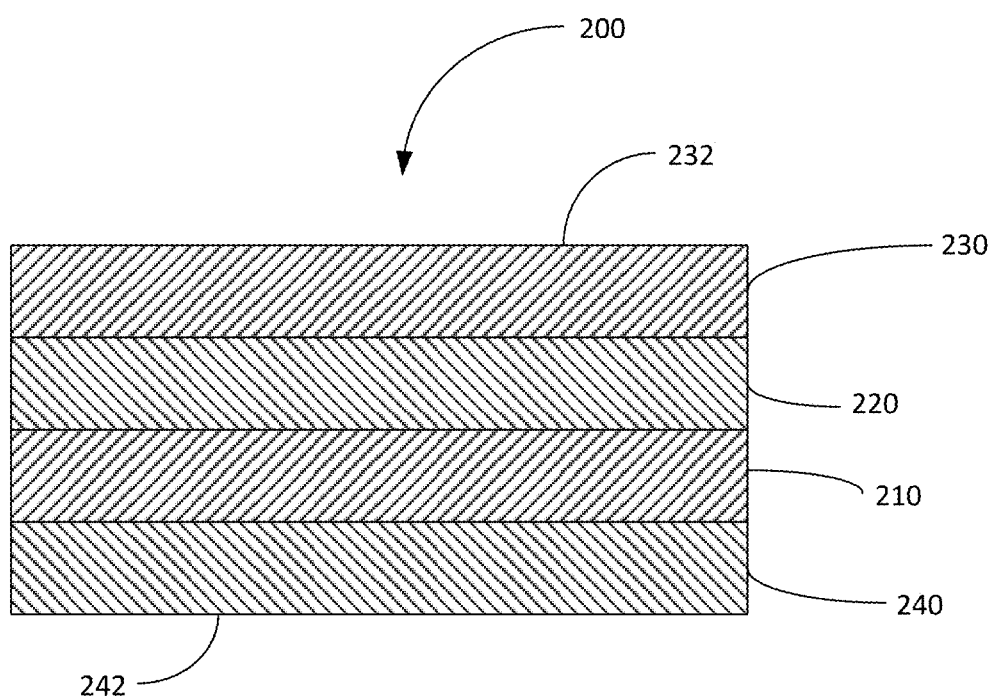

In one embodiment, the tape may be attached to the flexible substrate. The tape employed may be a two-sided tape (e.g., as illustrated in FIG. 2a and FIG. 2b). The substrate facing adhesive (e.g., adhesive 210) is chosen to impart appropriate adhesion to the flexible material of the substrate.

The two-part adhesive system is applied to the surfaces of the article that are to be joined together to selectively close or seal the article. By way of a non-limiting example, in a package (e.g., a food package) provided as a bag, the article (or more specifically the package) may comprise opposing sidewalls formed from a flexible material each having an inner surface with an opening at one end between the two sidewalls. Referring to FIG. 1, the surfaces 130 and 140 may, for example, represent the surfaces of the sidewalls. A thin PSA layer may be used to attach the tape to the bag. A thin PSA layer is desirable to minimize the I-beam effect and lower the overall stiffness of the laminate. Suitable PSA's for bag attachment include, but are not limited to, Avery Dennison S246, Avery Dennison Hammerlock etc. The adhesive closure system is provided by providing a first adhesive on a surface of the sidewall and a second adhesive on the surface of an opposing sidewall, where the adhesive closure system is such that one or both of the adhesives is modified with a plurality of standoffs defining the modified surface topography to provide the reduced tack system. It is, of course, contemplated, that the adhesive closure system may be used in other packages and not just limited to conventional bag type packages. For example, the closure system could be used in a package with a "peel away" opening. Further still, a plurality of tape closure systems may be utilized on a single package. By way of a non-limiting example, two, three, four or more such tape closure systems may be utilized in conjunction with a single package. For example, a package may include two open ends whereby one tape closure system is operatively positioned on one end and a second tape closure system is operatively positioned on the second end. Any such configuration is contemplated hereby.

The tape may be applied to the flexible material in any suitable manner. The tape can be attached to the flexible material using automatic dispensing equipment in a continuous or intermittent manner. The tape can be attached through a manual process as well. The tape could be applied to the flexible material in the same direction as the package making process (i.e., in the machine direction (MD)), perpendicular to the package making process (i.e., in the transverse direction (TD)), or in any direction that is efficient to the applicable system. For example, the direction could be at a generally 45 degree angle relative to the direction of the package making process. The present teachings contemplated any variation of such angles. A tape dispensing mechanism may be incorporated into the unit to form the packaging. The tape dispensing mechanism may be of any appropriate configuration and type. The tape dispensing mechanism can allow for modifications to the location at which the tape is applied, can have a standard location that is not readily adjustable, or can comprise a combination of such. The tape dispensing mechanism may be manually controlled or controlled through a processor device, e.g., a computer or the like.

Figure 4:
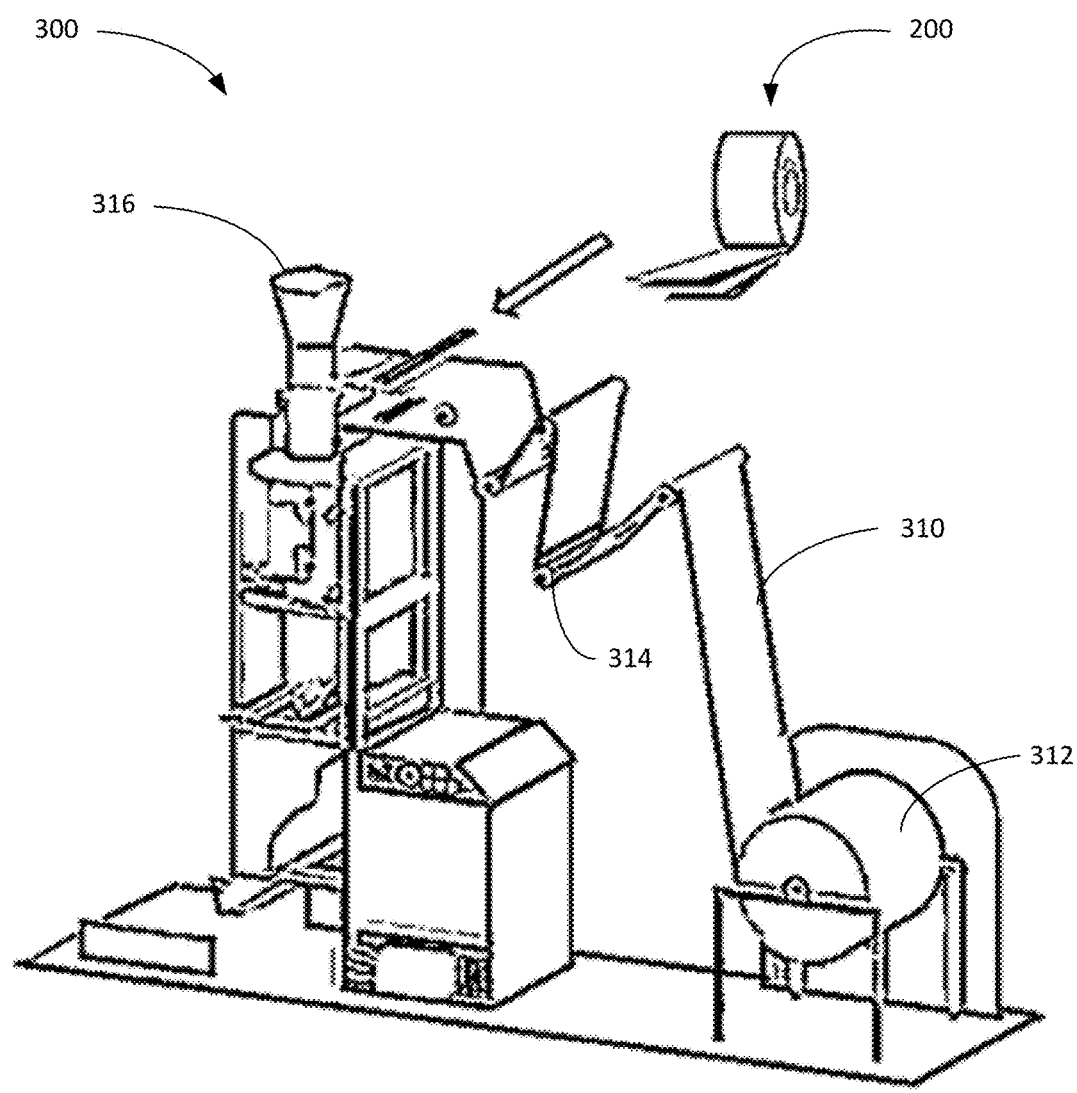
FIG. 4 is a plan view of a vertical form fill and seal system.

The tape can be applied to the flexible material off line and prior to filling the package, or the tape can be applied to the flexible material "in situ" as the bag is formed and filled with the desired contents. In embodiments, the tape is applied to the package in situ as the bag is filled with the desired contents. The tape can be applied in systems including vertical form fill and seal systems 300 and horizontal form fill and seal systems 400. It should be understood, however, that these are merely exemplary locations and that the tape can be applied in any appropriate direction relative to the applicable package. An example of a vertical film form and seal system 300 is illustrated in FIG. 4. Such systems are known to those skilled in the art. In such systems, the applicable contents are poured into the package using gravity. FIG. 4 illustrates a system 300 in which packaging film 310 is taken from a roll 312 of film and passed through tensioners 314 that keep it taut. The film then passes over a former, which directs the film into a vertical tube around a product 50 delivery cylinder 316. The tape system is provided by applying tape 200 to a section of the film. The tape 200 is applied to selected parts of the film transverse to the direction in which the film is being fed. As the tube is pulled downward by drive belts, the vertical tube of film is sealed along its length by a vertical sealer, forming a back seal. The machine then applies a pair of heat-sealing jaws against the tube to form a transverse seal. This transverse seal acts as the top seal on the bag below the sealing jaws and the bottom seal on the bag being filled and formed above the jaws. After the transverse seal has been formed, a cut is made across the sealed area to separate the finished bag below the seal from the partially completed bag above the seal. The film tube is then pushed downward to draw out another package length. Before the sealing jaws form each transverse seal, the product 50 to be packaged is dropped through the product delivery cylinder and is held within the tube above the transverse seal. It will be appreciated that the system FIG. 4 is just one example. Although, it should be understood that the package may be filled in any appropriate manner—especially depending upon the contents to be inserted in the packaging. By way of a non-limiting example, the contents may be filled into the packaging utilizing pneumatic pressure, hydraulic pressure, physical force, pushing force, or any such manner. Further, the contents may be inserted into the packaging through use of separate tools, e.g., blades, arms, etc. In accordance with some embodiments, the tape is dispensed in the transverse direction to form the reclosure mechanism.

Figure 5A:
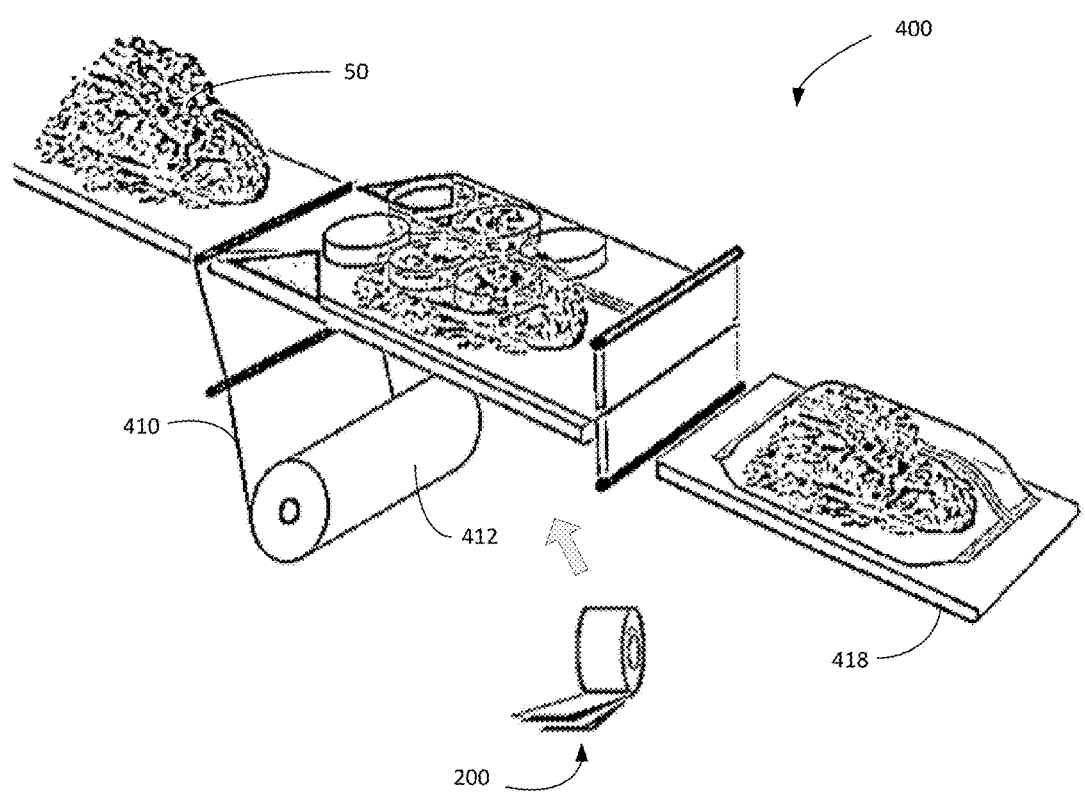
FIGS. 5a-c is a plan view of a horizontal form fill and seal system.
Figure 5B:
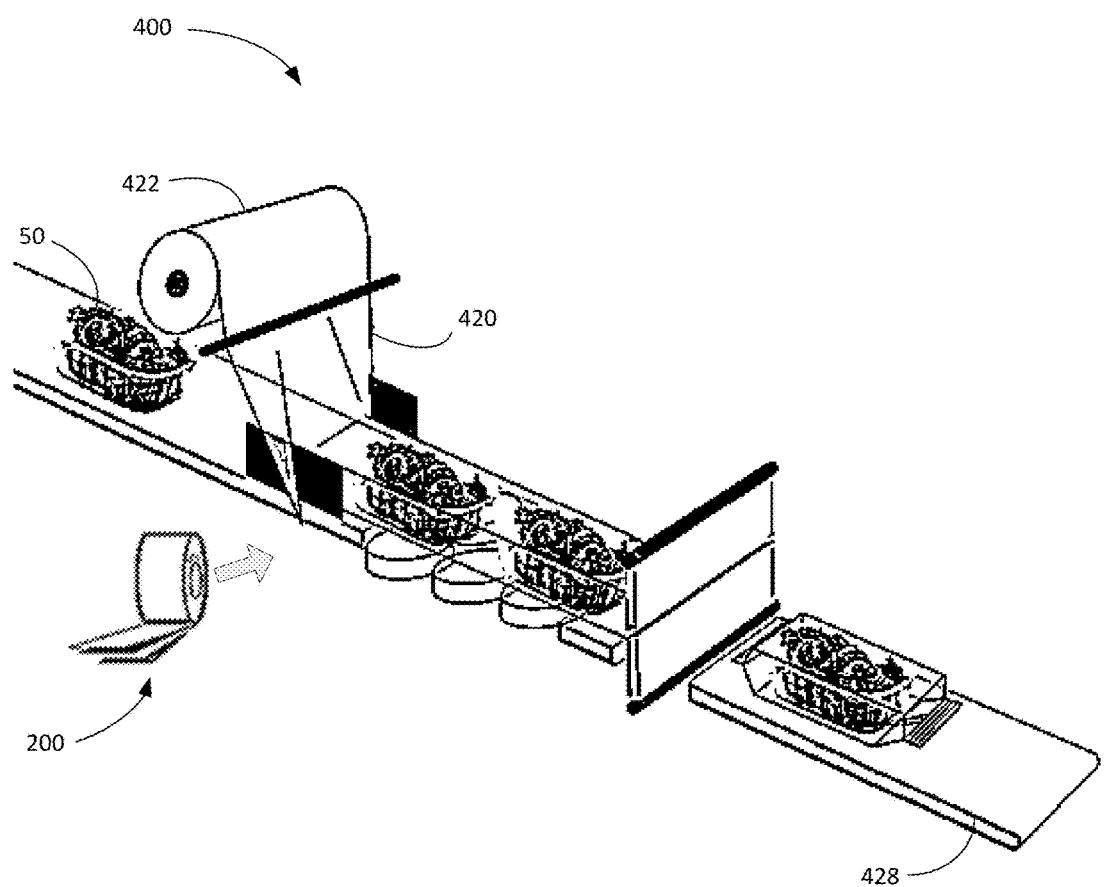
Figure 5C:
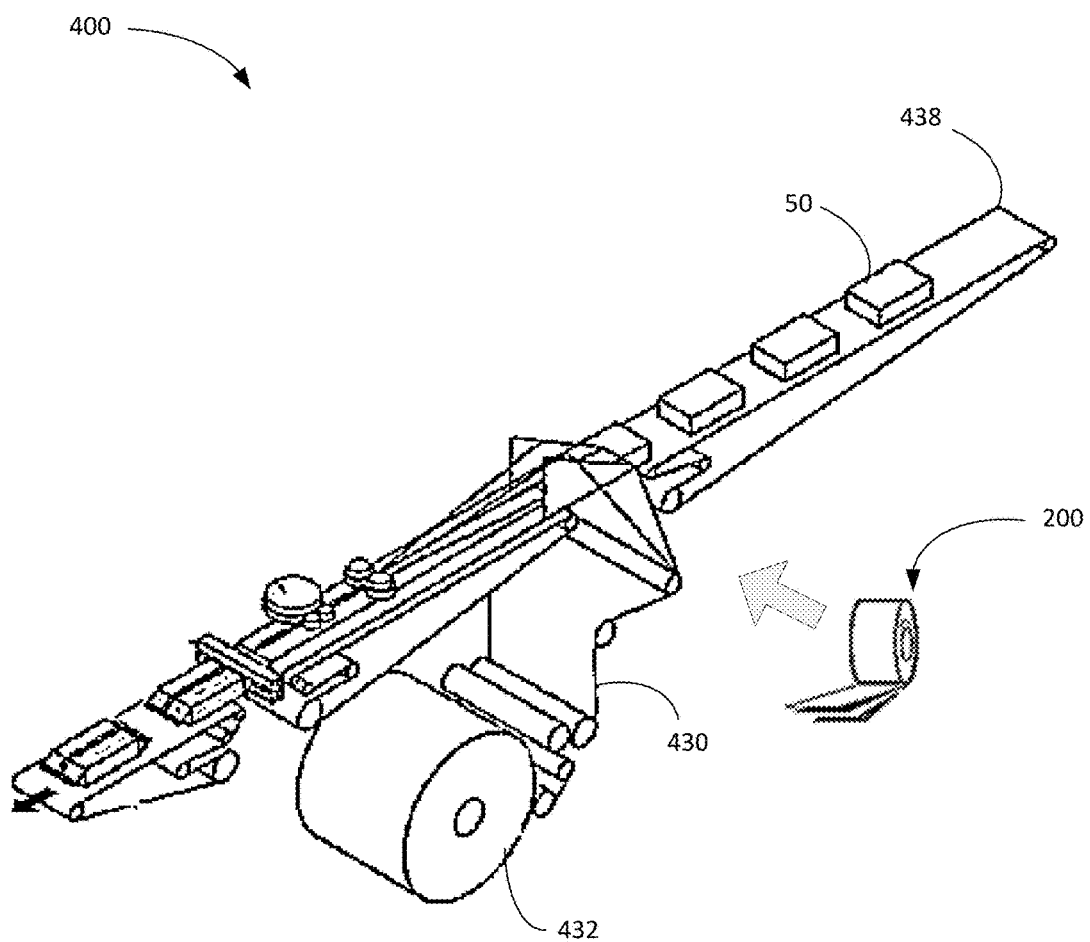

Examples of horizontal form fill and seal systems 400 are shown in FIGS. 5*a*-5*c*. In such systems, the product 50 is moved on a conveyor belt 418, 428, 438, and the flexible package is wrapped and sealed around the product. In accordance with some embodiments, a closure system formed from the present tapes is provided by applying or dispensing the tape in the transverse direction relative to the direction in which the package is formed. The present teachings are not limited to this configuration. The tapes may be applied to the packaging in any applicable direction and are not limited to those described herein. The descriptions are merely exemplary and are not intended to be exhaustive.

Figure 6:
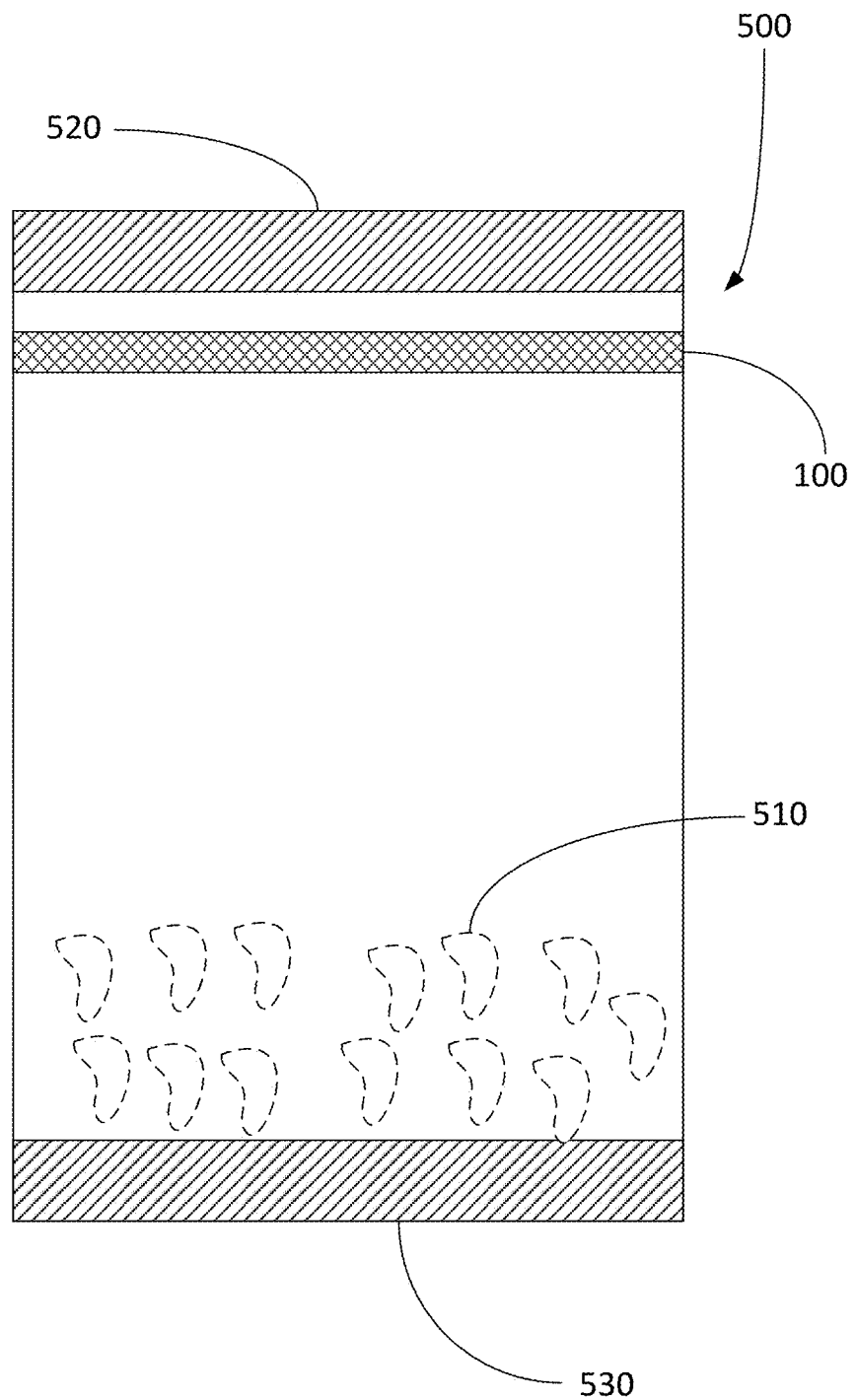
FIG. 6 is a plan view of a front of a package employing a tape closure system.
Figure 7:
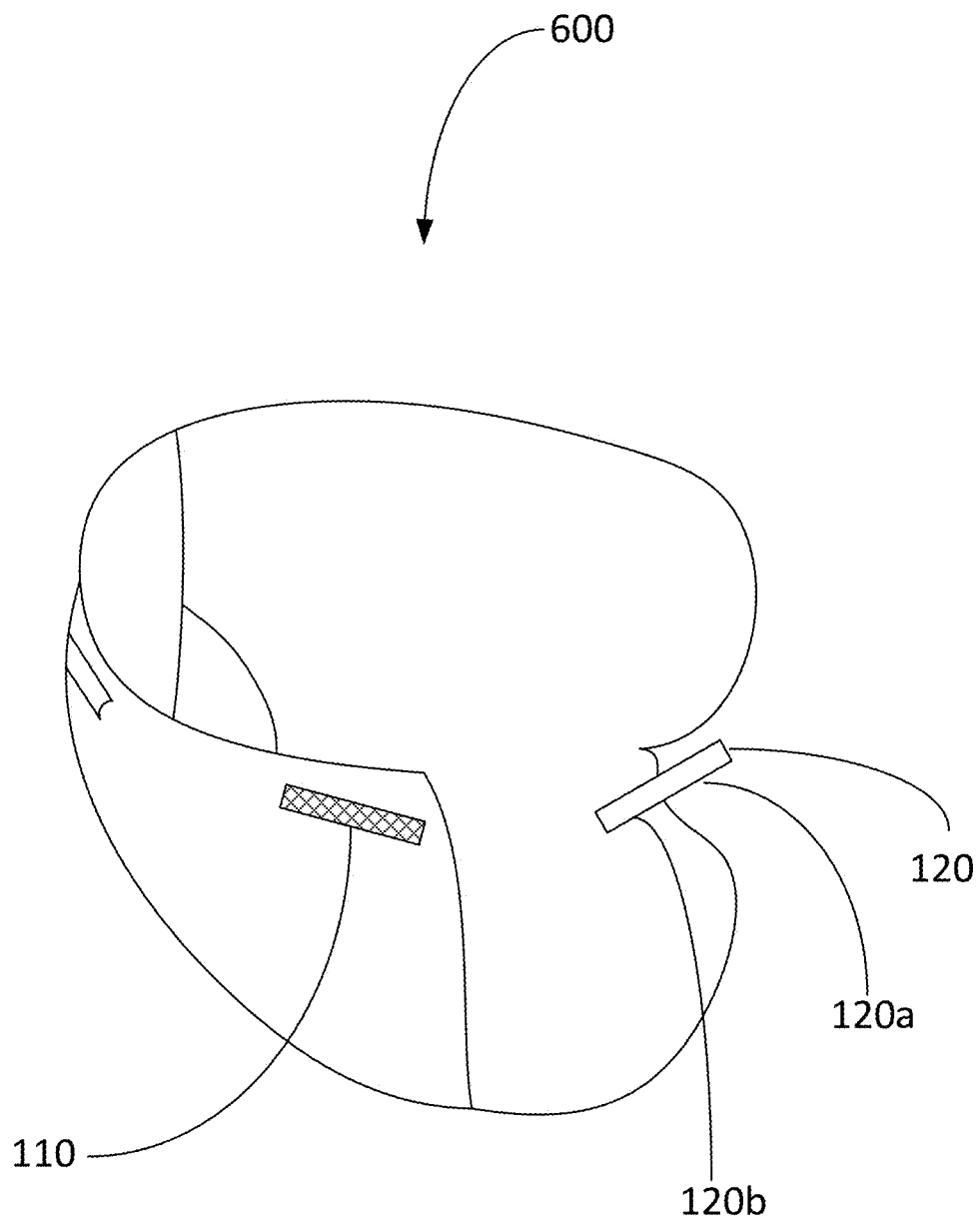
FIG. 7 is a perspective view of a diaper employing a tape closure system

FIGS. 6 and 7 illustrate examples of environments in which the tape closure system may be employed. FIG. 6 illustrates a package 500 (as may be formed by any suitable method) for storing a material (e.g., a food product) 510. The package includes an end seal 520 at a first end of the package, and an end seal 530 at the other end of the package. End seal 520 may be broken and separated to open the package. The package includes a tape closure system 100 for selectively resealing the package as may be desired.

FIG. 7 illustrates a diaper employing a closure system in accordance with the present technology. The diaper 600 includes a tape system 100 that includes a tape 110 disposed on a front face of the diaper and a tape 120 disposed on an edge of the back panel. A portion of the tape 120 hangs over the edge. The portion of tape 120 overhanging the edge of the diaper and oriented toward the diaper is brought into contact with the surface of tape 120 to close the diaper. The exposed surface of the tape 110 includes a modified surface, and the surface of tape 120 that is oriented toward the diaper includes a modified surface to unseal the diaper and to selectively reseal the diaper as desired. It will be appreciated that a portion 120*a* of the tape 120 may comprise a permanent adhesive to permanent attach a portion of the tape to the diaper surface. The underside of portion 120*b* comprises the modified adhesive surface to be releasably secured to the tape 110.

The following examples illustrate embodiments in accordance with aspects of the present teachings. Various pressure sensitive adhesives were modified with an additive material to provide a modified surface topography (also referred to as a detack layer or detack surface). The term PET and Mylar are used interchangeably in the examples and tables.

T Peel Measurements

The laminates were made by attaching the PSA layer 210 (such as S 246 from Avery Dennison at 18 gsm coat weight) from FIG. 2 to the cereal bag or other bag material. The T peel values of the various tape modifications were tested by bringing together the modified PSA surfaces 232, laminating them, dwelling them for various times and then testing the T peel using a Labthink XLB(B) Auto Tensile tester (Labthink Instruments Co. Ltd.) using a separation speed to 300 mm/min. Typically, a half-inch width of the tape of the pressure sensitive adhesive with the detack layer (or in some cases just the pressure sensitive adhesive) was attached to the other half of the tape, placed on a hard surface, and rolled back and forth once with a 2 kg rubber roller. The dwell time after lamination is typically 30 minutes unless otherwise specified in the examples. The ends were delaminated and attached to the clamps of a LabThink XLB(B) Auto Tensile tester and separated at a speed of 300 mm/min. An average of 3 to 5 specimens was tested, and the average T Peel data is reported in N/inch (N/in).

In examples where food stuff such as cereal, chips, or other contents of a bag were used to test the adhesion of the adhesive after pouring the food stuff across the adhesive surface, the following method was used:

The tape with the adhesive surface was attached to the side of a cardboard jig having a 45 degree angle. The food stuff was poured across the tape, and the method described in the previous paragraph was employed to evaluate T Peel. T Peel was measured after 1, 5, and 10 closures.

Friction Test

A one inch sample of the laminate was laid down on a stationary stainless steel panel with the detack layer touching the stainless steel panel. A 200 gram weight was placed on top of the tape, and the end of the tape was attached to a Fish Scale AdiyZ portable electronic scale. The digital scale was pulled at a constant speed of 3.85 feet/min. with the tape moving across the stainless steel panel with the 200 gram weight on top of the tape. The frictional force of the detack/pressure sensitive adhesive layer moving across the stainless steel panel with the 200 gram weight on the tape is recorded in pounds (lb). Swifttherm 84659 and Advantra PHC 9200 yielded values of 0.18 and 0.3 lb. respectively.

Detack Surface Coverage Measurement

A digital photo of the detackified pressure sensitive adhesive surface was taken using an Ablegrid 2 Megapixel USB digital microscope. The image was analyzed using an ImageJ analyzer, which is an NIH free-ware. The surface coverage was recorded as a percentage of the total area covered by the detack layer.

Detack Coat Weight Measurement

The coat weight of the detack layer on the pressure sensitive adhesive was measured gravimetrically by first measuring the weight of a 2 inch by 2 inch area of the pressure sensitive adhesive with the film and subtracting it from the total weight of the detack layer/pressure sensitive adhesive/film.

Width of the Filament

A digital photo of the detackified pressure sensitive adhesive was taken using an Ablegrid 2 Megapixel USB digital microscope. The particle size and distribution of the spray coated samples was determined using ImageJ software. The filament width (with hot melt sprayed detack layer) was measured directly from the image and averaged.

Example 1

A hot melt adhesive HL 8005 X from HB Fuller was printed using nylon mesh screens (Component Supply Company) with the following Food Grade inks from Colorcon: FGN 5427 Black No Tox Direct contact printing ink, FGN 5474 Blue No Tox Direct contact printing ink, and FGN 5424 Yellow No Tox Direct contact printing ink. The following nylon mesh screens were used: 52 microns (32% open area), 64 microns (47% open area), and 25 microns (15% open area). FIGS. 8-11 shows several screen-printed surfaces and the data on these surfaces is shown in Table 1.

TABLE 1

| Example | PSA coat wt gsm | Mesh size μm | Ink coat wt, gsm | Colorcon Ink Type | T Peel, 30 min N/in | T Peel, 24 hr N/in | T Peel, 7 days N/in |
|---|---|---|---|---|---|---|---|
| Control | 25 | | | | 2.3 | 3 | 3.3 |
| 1.1.1 | 25 | 25 | 10.9 | FGN 5427 | 2 | 2.3 | 2.9 |
| 1.1.2 | 25 | 25 | 15.8 | FGN 5427 | 1.1 | 1 | 1.5 |
| 1.1.3 | 25 | 52 | 6.2 | FGN 5427 | 1.3 | | 1.8 |
| 1.1.4 | 25 | 52 | 11 | FGN 5427 | 1.6 | 1.7 | 1.4 |
| 1.1.5 | 25 | 64 | 15.5 | FGN 5427 | 1.1 | 1.1 | 2.2 |
| 1.1.6 | 25 | 64 | 21.9 | FGN 5427 | 0.5 | 0.2 | 0.5 |
| 1.1.7 | 45 | 25 | 12.9 | FGN 5424 | 1.9 | 1.9 | 1.8 |
| 1.1.8 | 45 | 64 | 12.1 | FGN 5424 | 1.1 | 1.2 | 1.8 |
| 1.1.9 | 25 | 64 | 18.9 | FGN 5424 | 0.9 | 0.6 | 0.6 |
| 1.2 | 45 | 25 | 11 | FGN 5474 | 1.9 | 1.6 | 1.8 |
| 1.2.1 | 45 | 64 | 24.8 | FGN 5474 | 0.35 | 0.5 | 0.6 |
| 1.2.2 | 45 | 64 | 19 | FGN 5474 | 0.6 | 0.3 | 0.4 |
| 1.2.3 | 45 | 64 | 26 | FGN 5474 | 0.2 | 0.2 | 0.2 |

Example 2

The hot melt adhesive HL 8005X coated on 2 mil Mylar was sprayed with a hot melt elastomer, PHC 9200 from HB Fuller. The spraying was carried out with a Nordson Universal spray nozzle system using low flow continuous signature, intermittent signature, and control coat nozzles using the VB12 unit and using low flow gear pump pR6m1 (flow rate of 0.83 g/cc per rev). The T Peel data of modified adhesive to adhesive on Mylar is shown in Table 2. The surface coverage is the percentage of PSA surface covered by the additive. The finger slide rating in Table 2 is rated from 5 being non-tacky to touch to 1 being tacky to touch. Several of the sprayed surfaces are shown in FIGS. 12-22.

TABLE 2

| Example | PSA coat wt gsm | Nozzle Type | Pattern Air pressure (psi) | Pattern Air Temp ° F. | Line speed (fpm) | Gun height inch | Pump speed (rpm) | Surface coverage % | Finger slide Rating | T Peel 30 min N/in |
|---|---|---|---|---|---|---|---|---|---|---|
| 2.1 | 15 | Low Flow Cont. Sig. | 8 | 275 | 200 | 3 | 3 | 16.3 | 4 | 0.15 |
| 2.1.1 | 15 | Low Flow Cont. Sig. | 8 | 275 | 150 | 3 | 3 | 20.2 | 4 | 0.4 |
| 2.1.2 | 30 | Low Flow Cont. Sig. | 8 | 275 | 175 | 3 | 3 | 15.4 | 4 | 0.7 |
| 2.1.3 | 30 | Low Flow Cont. Sig. | 8 | 275 | 150 | 3 | 3 | 21 | 4 | 0.4 |
| 2.1.4 | 45 | Low Flow Cont. Sig. | 8 | 275 | 200 | 3 | 3 | 19 | 4 | 0.8 |
| 2.1.5 | 45 | Low Flow Cont. Sig. | 8 | 275 | 175 | 3 | 3 | 22.1 | 4 | 0.26 |
| 2.1.6 | 45 | Low Flow Cont. Sig. | 8 | 275 | 150 | 3 | 3 | 29 | 3 | 0.14 |
| 2.2 | 15 | Intermittent Sig. | 20 | 275 | 150 | 2.5 | 3 | 12.1 | 3 | 0.4 |
| 2.2.1 | 15 | Intermittent Sig. | 8 | 275 | 175 | 3 | 3.25 | 19.2 | 4 | 0.25 |
| 2.2.2 | 30 | Intermittent Sig. | 8 | 275 | 150 | 3 | 3.25 | 21.5 | 4 | 0.36 |
| 2.2.3 | 30 | Intermittent Sig. | 8 | 275 | 100 | 3 | 3.25 | 24 | 5 | 0.3 |
| 2.2.4 | 30 | Intermittent Sig. | 8 | 275 | 125 | 3 | 3.25 | 26.1 | 5 | 0.12 |
| 2.2.5 | 45 | Intermittent Sig. | 8 | 275 | 200 | 3 | 3.25 | 25.2 | 4 | 0.2 |
| 2.2.6 | 45 | Intermittent Sig. | 8 | 275 | 180 | 3 | 3.25 | 29.1 | 4 | 0.3 |
| 2.2.7 | 45 | Intermittent Sig. | 8 | 275 | 150 | 3 | 3.25 | 32.8 | 5 | 0.2 |
| 2.3 | 30 | Control coat | 20 | 275 | 100 | 2.5 | 3 | 19.1 | | 0.4 |
| 2.3.1 | 30 | Control coat | 20 | 275 | 120 | 2.5 | 3 | 22.5 | | 0.3 |
| 2.3.2 | 30 | Control coat | 20 | 275 | 150 | 2.5 | 3 | 28.7 | | 0.6 |
| 2.3.3 | 45 | Control coat | 20 | 275 | 85 | 2.5 | 3 | 23.9 | | 1 |
| 2.3.4 | 45 | Control coat | 20 | 275 | 60 | 2.5 | 3 | 27 | | 0.8 |
| 2.3.5 | 45 | Control coat | 20 | 275 | 45 | 2.5 | 3 | 30.8 | | 0.6 |

Example 3

A hot melt PSA HL 8005X from HB Fuller was coated on a paper liner (from Chemsultants) at 40 gsm coat weight and laminated to 2 mil Mylar from Chemsultants. The liner was removed and $CaCO_3$ (Hubercal 150FG) from Huber Engineered Materials was sprinkled evenly onto the surface at various coat weights. This PSA surface was non-tacky to the touch and a finger could easily slide over it. Strips of this surface modified PSA brought together and pressed with fingers formed a good seal and could be repeatedly opened and closed. The coat weight of $CaCO_3$ was 12.1 gsm, average particle diameter on surface was 42 μm and 30 min T Peel was 3.75 N/inch.

Example 4

The hot melt adhesive HL 8005X coated on 2 mil Mylar was sprayed using an air brush with the following Food Grade ink from Colorcon: FGN 5427 Black No Tox Direct contact printing ink. Half inch strips of the sprayed PSA surfaces were brought together and rolled with a 2 kilogram (kg) roller, allowed to dwell for 30 minutes, 24 hours, and 8 days, and the T Peel value was measured. Data is shown in Table 4.

TABLE 4

| Example | PSA type | PSA coat wt gsm | Ink coat wt gsm | Colorcon Ink Type | Ink coverage % | Av particle diameter (μm) | T Peel, 30 min N/in | T peel, 24 hr N/in | T peel, 8 days N/in |
|---|---|---|---|---|---|---|---|---|---|
| 4.1 | HL 8005X | 25 | 7.3 | FGN 5427 | 10.60 | 36 | 3 | 4.2 | 4 |
| 4.2 | HL 8005X | 25 | 10 | FGN 5427 | 12.4 | 38 | 2.4 | 4 | 4.6 |

TABLE 4-continued

| Example | PSA type | PSA coat wt gsm | Ink coat wt gsm | Colorcon Ink Type | Ink coverage % | Av particle diameter (μm) | T Peel, 30 min N/in | T peel, 24 hr N/in | T peel, 8 days N/in |
|---|---|---|---|---|---|---|---|---|---|
| 4.3 | HL 8005X | 25 | 11.6 | FGN 5427 | 16.4 | 40 | 2.2 | 2 | |
| 4.4 | HL 8005X | 25 | 12.4 | FGN 5427 | 32.5 | 56 | 1.6 | | 2.4 |

Example 5

Three hot melt PSAs from Avery Dennison, FA20, R128, Z3000 coated on 1 mil PET facestock were sprayed with Colorcon FGN 5427 Black ink at various coverages. The other side of PET was laminated to a transfer tape of Avery Dennison Hammerlock adhesive coated at around 30 gsm. The free side of the Hammerlock adhesive was laminated to 2 mil HDPE film. Half inch strips of the sprayed PSA surfaces were brought together and rolled with a 2 kg roller, allowed to dwell for 1 hour and tested in a T Peel configuration using the Labthink XLB(B) tester at 300 mm/min. Data is shown in Table 5.

TABLE 5

| Example | PSA type | PSA coat wt, gsm | Ink coat wt, gsm | Colorcon Ink Type | Ink coverage % | Av particle diameter (μm) | T Peel, 1 hr, N/in |
|---|---|---|---|---|---|---|---|
| 5.1 | AD FA20 | 30 | 0 | | | | 3 |
| 5.1.1 | AD FA20 | 30 | 7.7 | FGN 5427 | 12.2 | | 3.3 |
| 5.1.2 | AD FA20 | 30 | 9.3 | FGN 5427 | 19.4 | | 3.3 |
| 5.1.3 | AD FA20 | 30 | 10 | FGN 5427 | 21.3 | | 2.7 |
| 5.2 | AD R-128 | 30 | 0 | | | | 6.7 |
| 5.2.1 | AD R-128 | 30 | 7.8 | FGN 5427 | 14.6 | 39 | 4.2 |
| 5.2.2 | AD R-128 | 30 | 9 | FGN 5427 | 19.3 | | 3.8 |
| 5.2.3 | AD R-128 | 30 | 9.8 | FGN 5427 | 24.6 | | 2.6 |
| 5.3 | AD Z-3000 | 30 | 0 | | | | 10.5 |
| 5.3.1 | AD Z-3000 | 30 | 7.6 | FGN 5427 | 11.2 | | 6.2 |
| 5.3.2 | AD Z-3000 | 30 | 8.9 | FGN 5427 | 17.6 | | 6.2 |
| 5.3.3 | AD Z-3000 | 30 | 9.9 | FGN 5427 | 24.3 | | 3.6 |

Example 6

The hot melt adhesives of the examples coated on 1 mil Mylar at 30 gsm coat weight were sprayed with detack layer on a Nordson VB12 table top unit. The nozzle type was Continuous Signature Low flow, the pattern air temperature was 275° F., the line speed was 275 feet per minute, the gun height was 2.5 inches, and the pump type was PR6M1 with a feed rate of 0.93 g/revolution. The PSA types used were ADZ3000 (A), AD FA 20 (B), AD R128 (C), and Fuller8005 (D). The detack materials used were Fuller PHC 9200 (E) and PHL 4157 (F). This laminate was used for T Peel testing. T Peel was measured after 1, 5, and 10 laminations. The results are shown in Table 6.

TABLE 6

| Example | PSA type | PSA coat wt. gsm | Pattern Air pressure (psi) | Pump Speed (rpm) | Detack Material | Detack coat weight gsm | Detack surface coverage % | T peel after reclosures, N/inch 1 | 5 | 10 | Friction test, lb | Width of the detack filament, μ |
|---|---|---|---|---|---|---|---|---|---|---|---|---|
| Control | 1 mil Mylar, No PSA | 0 | | | None | 0 | 0 | | | | 0.11 | |
| 6.1 | A | 30 | 10 | 15 | E | 4.1 | 37.1 | 7.2 | 9 | 8.5 | 0.35 | 30-120 |
| 6.2 | A | 30 | 10 | 20 | E | 5.2 | 41.3 | 4.9 | 4 | 4 | 0.42 | 25-95 |
| 6.3 | A | 30 | 12 | 15 | E | 5.7 | 50.7 | 4.1 | 4.7 | 5.7 | 0.56 | 20-120 |
| 6.4 | A | 30 | 12 | 10 | E | 2.5 | 46 | 5.8 | 7 | 8.3 | | |
| 6.5 | A | 30 | 10 | 25 | E | 7 | 44.4 | 2.3 | 3.1 | 3.3 | 0.36 | |
| 6.6 | A | 30 | 14 | 10 | E | 2.9 | 52.7 | 8 | 7.4 | 8.2 | 0.78 | |
| 6.7 | A | 30 | 14 | 6 | E | | 43.9 | 5.8 | 7.5 | 8.5 | 1.11 | 15-50 |
| 6.8 | B | 30 | 10 | 15 | E | 4.2 | 25.4 | 4.9 | 4.2 | 5.7 | 1.8 | 20-50 |
| 6.9 | C | 30 | 10 | 15 | E | 3.8 | 28.5 | 3.1 | 5.4 | 4.6 | 1.6 | |
| 6.10 | D | 44 | 10 | 15 | E | | 38.7 | 1.2 | 0.8 | 0.7 | 1.76 (transfer)* | |
| 6.11 | A | 30 | 10 | 15 | F | 4.3 | 25.5 | 3.9 | 4.3 | 8 | | |
| 6.12 | B | 30 | 10 | 20 | F | 5.9 | 19.8 | 5.3 | 6.3 | 7.5 | 2.15 | |
| 6.13 | C | 30 | 10 | 25 | F | 6.4 | 27.7 | 3.2 | 4.8 | 6.1 | 1.78 | |
| 6.14 | D | 44 | 10 | 15 | F | 5.4 | 29.2 | 0.4 | 0 | 0 | 2.2 (transfer)* | |

*Some of the detack layer transferred to the SS panel

Example 7

T Peel data after a different number of reclosures was evaluated with and without cereal poured across the tape. Cheerios® were employed as the cereal and in each case, 1 cup of cereal was poured across each time. Table 7 shows results of these tests.

TABLE 7

| Ex. | Sample | T Peel after reclosures, N/inch 1 | 5 | 10 | Detack coat weight, gsm | PSA coat wt, gsm | Detack Surface Coverage % | Finger slide rating before and after reclosures | Friction test, lb |
|---|---|---|---|---|---|---|---|---|---|
| Control | 1 mil Mylar film (Chemsultants) | | | | | | | | 0.11 |
| 7.1 | Avery Z3000 | 11 | 9.2 | 8.73 | | 30 | | 1 | Too high, CNM* |
| 7.2 | Avery Z3000 + Cheerios® | 5 | 2.53 | 0.82 | | 30 | | | |
| 7.3 | Fuller Swiftmelt 82674 | 32 | 38 | 26 | | 30 | | 1 | Too high, CNM* |
| 7.4 | Fuller Swiftmelt 82674 + Cheerios® | 20 | 6.67 | 2.3 | | 30 | | | |
| 7.5 | Fuller HL2811 PW | 18.83 | 17.7 | 16.1 | | 30 | | 1 | Too high, CNM* |
| 7.6 | Fuller HL2811 PW + Cheerios® | 8.67 | 4.1 | 1.73 | | 30 | | | |
| 7.7 | Avery Z3000 | 11 | 9.2 | 8.73 | | 30 | | 1 | Too high, CNM* |
| 7.8 | Avery Z3000 + 9200 detack (Ex 6.1) | 7.2 | 9 | 8.5 | 4.1 | 30 | 37.1 | 5 | 0.35 |
| 7.9 | Avery Z3000 + Cheerios® | 5 | 2.53 | 0.82 | | 30 | | | |
| 7.10 | Avery Z3000 + 9200 detack(Ex 6.1) + Cheerios® | 4.6 | 1.71 | 0.4 | 4.1 | 30 | | 5 | |
| 7.11 | Avery Z3000 + 9200 detack(Ex6.6) + Cheerios® | 6.2 | 3.93 | 0.85 | 2.94 | 30 | 52.7 | 5 | |

TABLE 7-continued

| Ex. | Sample | T Peel after reclosures, N/inch | | | Detack coat weight, gsm | PSA coat wt, gsm | Detack Surface Coverage % | Finger slide rating before and after reclosures | Friction test, lb |
| --- | --- | --- | --- | --- | --- | --- | --- | --- | --- |
| | | 1 | 5 | 10 | | | | | |
| 7.12 | Avery Z3000 + 9200 detack(Ex 6.7) + Cheerios ® | 4.4 | 2.5 | 0.68 | 4.1 | 30 | 43.9 | 5 | |
| 7.13 | Avery FA 20 | 4.13 | 4.3 | 4.63 | | 30 | | | Too high, CNM* |
| 7.14 | Avery FA20 + Cheerios ® | 3.9 | 2.13 | 0.53 | | 30 | | | |
| 7.15 | Avery R128 | 3.6 | 2.8 | 2.4 | | 30 | | 1 | Too high, CNM* |
| 7.16 | Avery R128 + 9200 detack (Ex 6.9) | 3.1 | 5.4 | 4.6 | 3.8 | 30 | 28.5 | 5 | 1.6 |
| 7.17 | Avery R128 + 9200 detack(Ex 6.9) + Cheerios ® | 2.4 | 1.37 | 0.86 | | 30 | | | |
| 7.18 | Fuller 8005 | 1.2 | 0.8 | 0.7 | | 44 | | 1 | Too high, CNM* |
| 7.19 | Fuller 8005 + 9200 detack(Ex 6.10) + Cheerios ® | 0.24 | 0 | 0 | | 44 | | | |

*CNM = could not measure - PSA was sticking to the SS panel too strongly and it was not possible to pull it along In the case of the tape without the detack layer, the surface is very sticky and the cereal sticks to the tape. The cereal remained stuck to the tape and had to be shaken off. With the detack layer, the surface is slidable to the finger, and the cereal slid right off the surface without sticking as illustrated by the high finger slide rating and low friction test. The surface of the 1 mil Mylar film against the stainless steel had a friction of 0.11 lb. Example 1 with Z3000 PSA with Fuller PHC 9200 as the detack layer gave a friction of 0.35 lb. The Z3000 adhesive without the detack layer had a friction that was too high to measure.

The T Peel values drop with the number of reclosures due to contamination of the adhesive surface. The openings between detack filaments or the features on the surface for getting the finger slidability are chosen so that they are smaller than the cereal being poured across the tape surface. Some fine food particles that are present in the bag, however, may fall between the filaments or other features used for detackifying the surface, leading to a reduction in T Peel. The adhesive choice, amount of detack layer, the pattern, the overall stiffness of the laminate, etc., are used to regulate the peel such that even after multiple pours across the tape surface, the tape still retains adequate adhesion to tightly seal the bag contents. A T Peel after 10 such reclosures on the order of 0.4 N/in or higher is generally sufficient to tightly seal a package.

Example 8

Table 8 shows data from tests evaluating a metallized Mylar bag of potato chips (Lays®). Example 6.1 of Table 6 was used as the pressure sensitive adhesive/detack layer on 1 mil Mylar. The PSA/detack layer was attached to the metallized bag using the S 246 transfer tape.

TABLE 8

| Example | T Peel after reclosures, N/inch | | | Detack coat weight, gsm | PSA coat wt, gsm | Detack Surface Coverage, % | Friction test, lb |
| --- | --- | --- | --- | --- | --- | --- | --- |
| | 1 | 5 | 10 | | | | |
| 8.1 | 1.9 | 1.7 | 0.6 | 4.1 | 30 | 37.1 | 0.35 |

Example 9

Two half inch by half inch strips of the tape of Example 6.1 were put together in such a way that the overlap area was 0.5 inches by 0.5 inches. This laminate was placed on a hard surface and the overlapped area was rolled up and down with a 2 kg rubber roller. After a 30 minute dwell time, the ends of the tape were placed in the jaws of the Labthink tester and separated at a speed of 300 mm/min. The dynamic shear value was measured to be 26 N/0.25 square inches.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a tape closure system. Modifications may occur to those skilled in the art and to those who may make and use the invention. The disclosed embodiments are merely for illustrative purposes and not intended to limit the scope of the invention or the subject matter set forth in the claims.

What is claimed is:

1. An adhesive closure system comprising:
a first pressure sensitive adhesive layer having an upper adhesive surface;
a second pressure sensitive adhesive layer having an upper adhesive surface;
wherein the upper adhesive surfaces of the first and second pressure sensitive adhesive layers are releasably securable to one another to form a closure, and the upper adhesive surface of (i) the first pressure sensitive adhesive layer, (ii) the second pressure sensitive adhesive layer, or (iii) both the first pressure sensitive adhesive and the second pressure sensitive adhesive layers comprises a plurality of filaments defining a modified surface topography;
wherein the filaments are of different lengths and/or thicknesses disposed in a random distribution on top of the upper adhesive surface of at least one pressure sensitive adhesive layer, and at least two of the plurality of filaments on a given adhesive layer partially overlap with one another;
wherein the filaments are formed by non-adhesive materials applied on the upper adhesive surface of at least one pressure sensitive adhesive layer; and
wherein the filaments are not ordered and comprise sprayed materials applied onto the upper adhesive surface to provide randomized distribution of the filaments on the upper adhesive surface.

2. The adhesive closure system of claim 1, wherein each of the first pressure sensitive adhesive layer and the second pressure sensitive adhesive layer has a modified surface topography at the upper adhesive surface.

3. The adhesive closure system of claim 2, wherein at least one of the filaments on the first pressure sensitive adhesive overlaps with at least one filament on the second pressure sensitive adhesive when the first and second pressure sensitive adhesives are brought into contact with one another.

4. The adhesive closure system of claim 1, wherein the standoffs filaments cover from about 5% to about 60% of the surface area of the adhesive surface.

5. The adhesive closure system of claim 1, wherein the system has a T Peel value of from about 0.2 N/inch to about 20 N/inch.

6. The adhesive closure system of claim 1, wherein the first pressure sensitive adhesive layer and the second pressure sensitive adhesive layer are provided as a tape.

7. The adhesive closure system of claim 1, wherein the non-adhesive material is an elastomeric material, a polymeric material, a hot melt elastomer, or a combination thereof.

8. The adhesive closure system of claim 1, wherein the non-adhesive material comprising an elastomeric or a polymeric material has a modulus of about $0.5 \times 10^6$ dyne/cm$^2$ or greater.

9. The adhesive closure system of claim 1, wherein the non-adhesive material is a hot melt with a softening point of 67° C. or higher.

10. The adhesive closure system of claim 1, wherein the non-adhesive materials applied on the upper surfaces of the pressure sensitive adhesive layers comprise at least a hot melt with a softening point of 67° C. or higher, sprayed on the upper surfaces of the pressure sensitive adhesive layers.

11. The adhesive closure system of claim 1, wherein when the upper adhesive surfaces of the first and the second pressure sensitive adhesive layers are releasably secured to one another, a first adhesive on the upper adhesive surface of the first pressure sensitive adhesive layer contacts a second adhesive on the upper adhesive surface of the second pressure sensitive adhesive layer or contacts a combination of the second adhesive and the filaments on the upper adhesive surface of the second pressure sensitive adhesive.

12. An article having a first surface and a second surface adapted to be releasably joined together, the article comprising an adhesive closure system comprising:
a first pressure sensitive adhesive layer having an upper adhesive surface disposed on the first surface; and
a second pressure sensitive adhesive layer having an upper adhesive surface disposed on the second surface, wherein the upper adhesive surfaces of the first and second pressure sensitive adhesive layers are releasably adherable to one another, and the upper adhesive surface of (i) the first pressure sensitive adhesive layer, (ii) the second pressure sensitive adhesive layer, or (iii) both the first pressure sensitive adhesive and the second pressure sensitive adhesive layers comprises a plurality of filaments defining a modified surface topography;
wherein the filaments are of different lengths and/or thicknesses disposed in a random distribution on top of the upper adhesive surface of at least one pressure sensitive adhesive layer, and at least two of the plurality of filaments on a given adhesive layer partially overlap with one another;
wherein the filaments are formed by non-adhesive materials applied on the upper adhesive surface of at least one pressure sensitive adhesive layer, and
wherein the filaments are not ordered and comprise sprayed materials applied onto the upper adhesive surface to provide randomized distribution of the filaments on the upper adhesive surface.

13. The article of claim 12, wherein each of the first pressure sensitive adhesive layer and the second pressure sensitive adhesive layer have a modified surface topography at the upper adhesive surface.

14. The article of claim 13, wherein at least one of the filaments on the first pressure sensitive adhesive layer overlaps with at least one filament on the second pressure sensitive adhesive layer when the first and second pressure sensitive adhesive layers are brought into contact with one another.

15. The article of claim 12, wherein the filaments are formed from an elastomeric material or a polymeric material.

16. The article of claim 12, wherein the filaments cover from about 5% to about 60% of the surface area of the adhesive surface.

17. The article of claim 12, wherein the system has a T Peel value of from about 0.2 N/inch to about 20 N/inch.

18. The article of claim 12, wherein the first pressure sensitive adhesive layer and the second pressure sensitive adhesive layer are each provided as a tape comprising a lower adhesive, an upper pressure sensitive adhesive defining the upper adhesive surface, and a facestock or carrier film disposed between the lower adhesive and the upper pressure sensitive adhesive, the lower adhesive of the first pressure sensitive adhesive layer adhering the first pressure sensitive adhesive layer to the first surface, and the lower adhesive of the second pressure sensitive adhesive layer adhering the second pressure sensitive adhesive layer to the second surface.

19. The article of claim 12, wherein the article is a package defining an opening between the first and second surface.

20. The article of claim 19, wherein the first and second surface each define an inner surface of the package.

21. The article of claim 12, wherein the article is formed form a polymeric material, a paper, a nonwoven material, or a foil material.

22. The article of claim 12, wherein the article is in the form of a pillow pouch package, a stand-up pouch, a flat bottom bag, a double seam consumer bag, a bar wrap package, a flexible overwrap package, a flexible lid on a rigid package, or a diaper.

23. The article of claim 12, wherein the non-adhesive material is an elastomeric material, a polymeric material, a hot melt elastomer, or a combination thereof.

24. The article of claim 12, wherein the non-adhesive material comprising an elastomeric or a polymeric material has a modulus of about $0.5 \times 10^6$ dyne/cm$^2$ or greater.

25. The article of claim 12, wherein the non-adhesive materials applied on the upper surfaces of the pressure sensitive adhesive layers comprise at least a hot melt with a softening point of 67° C. or higher, sprayed on the upper surfaces of the pressure sensitive adhesive layers.

26. An adhesive closure system comprising:
a first pressure sensitive adhesive layer having an upper adhesive surface and a lower adhesive surface;
a second pressure sensitive adhesive layer having an upper adhesive surface and a lower adhesive surface;
wherein the upper adhesive surfaces of the first and second pressure sensitive adhesives layers are releasably securable to one another to form a closure, and the upper adhesive surface of (i) the first pressure sensitive adhesive layer, (ii) the second pressure sensitive adhesive layer, or (iii) both the first pressure sensitive adhesive and the second pressure sensitive adhesive layers comprises a plurality of filaments defining a modified surface topography;
wherein the filaments are of different lengths and/or thicknesses disposed in a random distribution on top of the upper adhesive surface of at least one pressure sensitive adhesive layer, and at least two of the plurality of filaments on a given adhesive layer partially overlap with one another;
wherein the filaments are formed by non-adhesive materials comprising a hot melt with a softening point of 67° C. or higher, applied on the upper adhesive surfaces of at least one pressure sensitive adhesive layer;
wherein the filaments are not ordered and comprise sprayed materials applied onto the upper adhesive surface to provide randomized distribution of the filaments on the upper adhesive surface;
wherein the upper adhesive surfaces of at least one pressure sensitive adhesive layers has a surface coverage by the filaments in the range from about 10% to about 50%.

27. An article having a first surface and a second surface adapted to be releasably joined together, the article comprising an adhesive closure system comprising:
a first pressure sensitive adhesive layer having an upper adhesive surface and a lower adhesive surface;
a second pressure sensitive adhesive layer having an upper adhesive surface and a lower adhesive surface;
wherein the upper adhesive surfaces of the first and second pressure sensitive adhesives layers are releasably securable to one another to form a closure, and the upper adhesive surface of (i) the first pressure sensitive adhesive layer, (ii) the second pressure sensitive adhesive layer, or (iii) both the first pressure sensitive adhesive and the second pressure sensitive adhesive layers comprises a plurality of filaments defining a modified surface topography;
wherein the filaments are of different lengths and/or thicknesses disposed in a random distribution on top of the upper adhesive surface of at least one pressure sensitive adhesive layer, and at least two of the plurality of filaments on a given adhesive layer partially overlap with one another;
wherein the filaments are formed by non-adhesive materials comprising a hot melt with a softening point of 67° C. or higher, applied on the upper adhesive surface of at least one pressure sensitive adhesive layer;
wherein the filaments are not ordered and comprise sprayed materials applied onto the upper adhesive surface to provide randomized distribution of the filaments on the upper adhesive surface; and
wherein the upper adhesive surface of at least one pressure sensitive adhesive layer has a surface coverage by the filaments in the range from about 10% to about 50%.

* * * * *